(12) United States Patent
Cohen

(10) Patent No.: US 10,740,011 B2
(45) Date of Patent: *Aug. 11, 2020

(54) STORAGE SYSTEM WITH APPLICATION TO NVM ADDRESS, SPAN, AND LENGTH

(71) Applicant: Seagate Technology LLC, Cupertino, CA (US)

(72) Inventor: Earl T. Cohen, Oakland, CA (US)

(73) Assignee: Seagate Technology LLC, Cupertino, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/946,891

(22) Filed: Apr. 6, 2018

(65) Prior Publication Data

US 2018/0232179 A1    Aug. 16, 2018

Related U.S. Application Data

(63) Continuation of application No. 15/409,127, filed on Jan. 18, 2017, now Pat. No. 9,971,547, which is a
(Continued)

(51) Int. Cl.
*G06F 3/06* (2006.01)
*G06F 12/02* (2006.01)
*G06F 12/1009* (2016.01)

(52) U.S. Cl.
CPC .......... *G06F 3/0638* (2013.01); *G06F 3/0608* (2013.01); *G06F 3/0679* (2013.01);
(Continued)

(58) Field of Classification Search
CPC .... G06F 3/0604; G06F 3/0679; G06F 3/0688; G06F 3/0644; G06F 12/0246; G06F 2212/7201

See application file for complete search history.

(56) References Cited

U.S. PATENT DOCUMENTS 9,582,431 B2 *   2/2017   Cohen ................... G06F 3/0608
9,971,547 B2 *   5/2018   Cohen ................... G06F 3/0608
(Continued)

FOREIGN PATENT DOCUMENTS

CN    101930404    12/2010
TW    201241615    10/2012
(Continued)

OTHER PUBLICATIONS

Seagate Technology LLC; Office Action for Chinese application No. 201410031027.7, filed Jan. 22, 2014, dated Sep. 6, 2017, 17 pgs.
(Continued)

*Primary Examiner* — Reginald G Bragdon
*Assistant Examiner* — Curtis James Kortman
(74) *Attorney, Agent, or Firm* — Taylor English Duma LLP

(57) ABSTRACT

Methods for determining, by a storage controller, a read unit address and encoded length information of one of the plurality of read units of a non-volatile memory (NVM) based at least in part on a page address of a particular one of a plurality of pages in a storage space address. The encoded length information may be decoded. The storage controller may determine a span specifying an integer number of the read units and a length in units having a finer granularity than the read units based at least in part on the page address. The storage controller may read data associated with the particular page based at least in part on the read unit address and the span. The storage controller may update space usage information of the NVM based at least in part on the length.

12 Claims, 8 Drawing Sheets

Related U.S. Application Data continuation of application No. 14/158,380, filed on Jan. 17, 2014, now Pat. No. 9,582,431.

(60) Provisional application No. 61/755,169, filed on Jan. 22, 2013.

(52) U.S. Cl.
CPC ...... G06F 12/0246 (2013.01); G06F 12/1009 (2013.01); *G06F 2212/7201* (2013.01)

(56) References Cited

U.S. PATENT DOCUMENTS

| | | |
|---|---|---|
| 2006/0212647 A1 | 9/2006 | Takai |
| 2008/0228997 A1* | 9/2008 | Farhan .................. G06F 3/0611 711/103 |
| 2009/0164704 A1 | 6/2009 | Kanade et al. |
| 2010/0293439 A1 | 11/2010 | Flynn et al. |
| 2011/0099321 A1 | 4/2011 | Haines et al. |
| 2011/0296133 A1 | 12/2011 | Flynn et al. |
| 2012/0290798 A1 | 11/2012 | Huang et al. |

FOREIGN PATENT DOCUMENTS

| | | |
|---|---|---|
| WO | 2012099937 | 7/2012 |
| WO | 2012075200 | 8/2019 |

OTHER PUBLICATIONS

LSI Corporation; Taiwan Office Action for serial No. 103102153, filed Jan. 20, 2014, dated May 7, 2015, 3 pgs.

* cited by examiner

STORAGE SYSTEM WITH APPLICATION TO NVM ADDRESS, SPAN, AND LENGTH

CROSS-REFERENCE TO RELATED APPLICATIONS

The present application is a continuation of U.S. non-provisional application Ser. No. 15/409,127, filed Jan. 18, 2017, now U.S. Pat. No. 9,971,547, entitled STORAGE ADDRESS SPACE TO NVM ADDRESS, SPAN, AND LENGTH, which is a continuation of U.S. non-provisional application Ser. No. 14/158,380, filed Jan. 17, 2014, now U.S. Pat. No. 9,582,431, entitled STORAGE ADDRESS SPACE TO NVM ADDRESS, SPAN, AND LENGTH MAPPING/CONVERTING, which claimed the benefit of U.S. provisional patent application Ser. No. 61/755,169, filed Jan. 22, 2013, wherein the foregoing applications are incorporated by reference in their entirety for all purposes. To the extent permitted by the type of the instant application, this application incorporates by reference for all purposes the following applications, all commonly owned with the instant application at the time the invention was made:

- U.S. Provisional Application Ser. No. 61/316,373, filed Mar. 22, 2010, first named inventor Radoslav DANILAK, and entitled ACCESSING COMPRESSED DATA OF VARYING-SIZED QUANTA IN NON-VOLATILE MEMORY;
- U.S. Provisional Application Ser. No. 61/418,846, filed Dec. 1, 2010, first named inventor Jeremy Isaac Nathaniel WERNER, and entitled DYNAMIC HIGHER-LEVEL REDUNDANCY MODE MANAGEMENT WITH INDEPENDENT SILICON ELEMENTS;
- U.S. Provisional Application Ser. No. 61/543,707, filed Oct. 5, 2011, first named inventor Earl T. COHEN, and entitled SELF-JOURNALING AND HIERARCHICAL CONSISTENCY FOR NON-VOLATILE STORAGE; and
- U.S. Provisional Application Ser. No. 61/755,169, filed Jan. 22, 2013, first named inventor Earl T. COHEN, and entitled STORAGE ADDRESS SPACE TO NVM ADDRESS, SPAN, AND LENGTH MAPPING/CONVERTING.

BACKGROUND

Field

Advancements in flash memory storage technology are needed to provide improvements in performance, efficiency, and utility of use.

SUMMARY

According to some embodiments, a method may comprise the steps of determining a read unit address and encoded length information of one of a plurality of read units of a non-volatile memory (NVM) based at least in part on a page address of a particular one of a plurality of pages in a storage space address, decoding the encoded length information, determining a span specifying an integer number of the read units and a length in units having a finer granularity than the read units based at least in part on the page address, reading data associated with the particular page based at least in part on the read unit address and the span, and updating space usage information of the NVM based at least in part on the length.

According to further embodiments, a method may comprise the steps of storing a logical page (Lpage) identification header in each starting read unit of a non-volatile memory (NVM), a starting read unit defined as a first read unit in an Lpage, the Lpage comprising a plurality of contiguous sectors of data present in the NVM; reading a table with art address mapping function of a storage controller in communication with the NVM; and responsive to the step of reading the table, referencing an Lpage by a read unit address. A size of the table is thereby smaller than a size of a conventional table that must store a byte address of every read unit in the NVM, the smaller size of the table resulting in greater efficiency in reading the table over reading the conventional table.

LIST OF REFERENCE SYMBOLS IN DRAWINGS

Figure 1A:
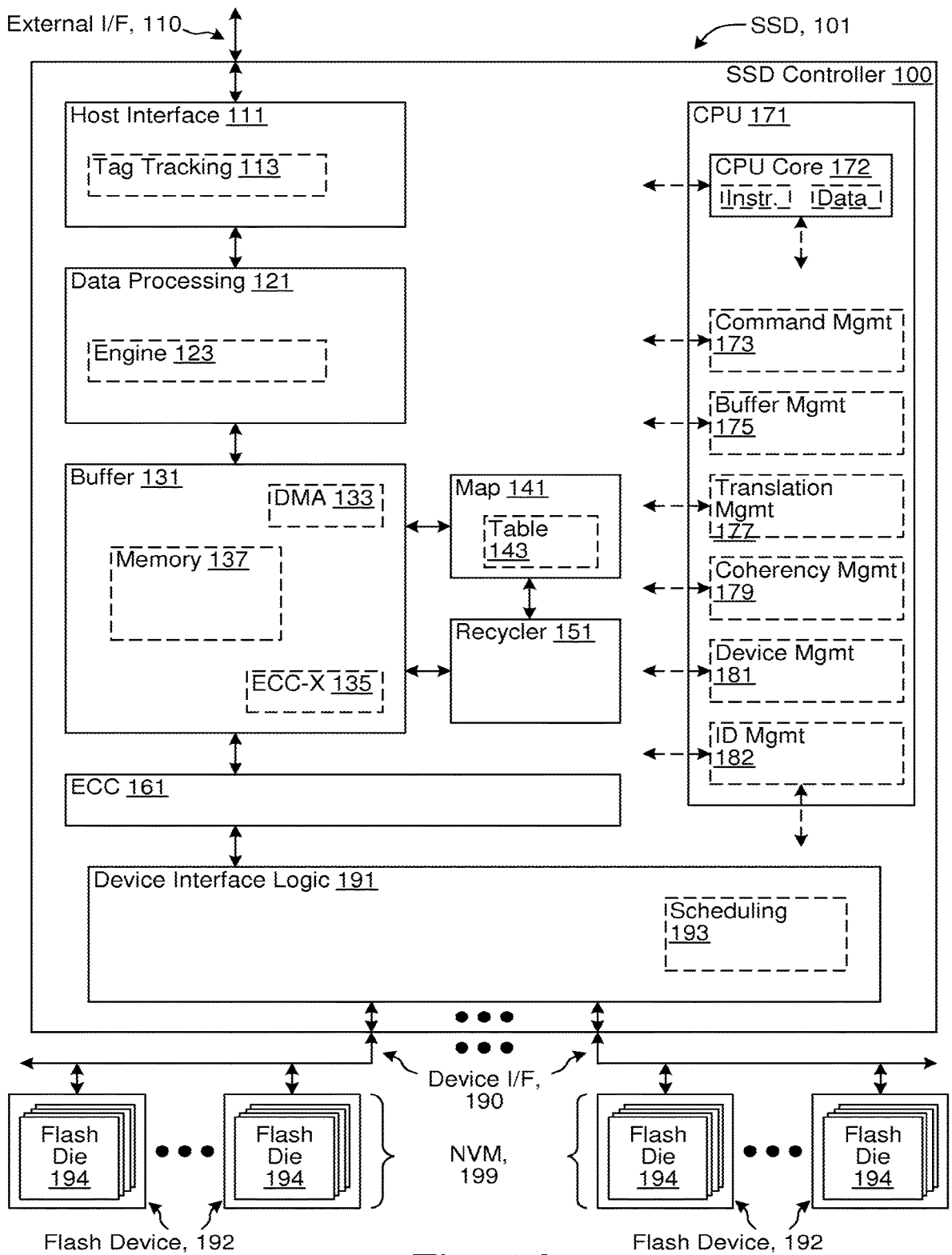
FIG. 1A illustrates selected details of an embodiment of a Solid-State Disk/Drive (SSD) including an SSD controller implementing storage address space to Non-Volatile Memory (NVM) address, span, and length mapping/converting, using various techniques for encoding location- and length-related information, such as within table entries of an address mapping function, as well as circuitry for managing non-volatile storage, such as flash memories.

| Ref. Symbol | Element Name |
|---|---|
| 100 | SSD Controller |
| 101 | SSD |
| 102 | Host |
| 103 | (optional) Switch/Fabric/Intermediate Controller |
| 104 | Intermediate Inferfaces |
| 105 | OS |
| 106 | Firmware (FW) |
| 107 | Driver |

| Ref. Symbol | Element Name |
| --- | --- |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 211 | LBA |
| 213 | LPN |
| 215 | Logical Offset |
| 221 | Map Info for LPN |
| 223 | Read Unit Address |
| 225 | Length in Read Units |
| 311 | Read Data |
| 313 | First Read Unit |
| 315 | Last Read Unit |
| 401A | Read Unit |
| 401B | Read Unit |
| 410B | Header Marker (HM) |
| 411A | Header 1 |
| 411B | Header 1 |
| 412B | Header 2 |
| 419A | Header N |
| 419B | Header N |
| 421A | Data Bytes |
| 421B | Data Bytes |
| 422B | Data Bytes |
| 429B | Data Bytes |
| 431A | Optional Padding Bytes |
| 431B | Optional Padding Bytes |
| 501 | Header |
| 511 | Type |
| 513 | Last Indicator |
| 515 | Flags |
| 517 | LPN |
| 519 | Length |
| 521 | Offset |
| 600 | Striping Direction |
| 601, 603, 609 | Devices |
| 610.0, 610.1, 610.61, 610.62, 610.63, 610.64, 610.65 | Flash Die |
| 610.0B0, 610.0B1, 610.0BB, 610.1B0, 610.1B1, 610.1BB, 610.65B0, 610.65B1, 610.65BB | Blocks |
| 610.0P0, 610.0P1, 610.0PP, 610.1P0, 610.1P1, 610.1PP, 610.65P0, 610.65P1, 610.65PP | Pages |
| 610.0R0, 610.0R1, 610.0RR, 610.1R0, 610.1R1, 610.1RR, 610.65R0, 610.65R1, 610.65RR | Read Units (RUs) |
| 660.0, 660.1, 660.R | R-blocks |
| 700 | LBA to NVM Location Mapping, generally |
| 710 | FLM |
| 710.1 | SLM Page/Length |
| 710.2 | SLM Page/Length |
| 710.M | SLM Page/Length |
| 710S | SLM Pointer |
| 720 | SLM Page |
| 720.1 | LB Page/Length |
| 720.2 | LB Page/Length |
| 720.N | LB Page/Length |
| 720L | LB Pointer |
| 721 | LBA |
| 722 | Integer Divider |
| 722Q | FLM Index |
| 722R | SLM Page Index |
| 723 | SLM Entries/SLM Page (CSR) |
| 822 | Encoded Length Information |
| 830 | Length/Span Decode |
| 832 | Span |
| 832A | Span |
| 834 | Length |
| 834A | Length |
| 850 | Data |
| 852 | Read Units (RUs) |
| 854 | Data image |

DETAILED DESCRIPTION

A description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
| --- | --- |
| AHCI | Advanced Host Controller Interface |
| API | Application Program Interface |
| ATA | Advanced Technology Attachment (AT Attachment) |
| BCH | Bose Chaudhuri Hocquenghem |
| CD | Compact Disk |
| CF | Compact Flash |
| CMOS | Complementary Metal Oxide Semiconductor |
| CPU | Central Processing Unit |
| CRC | Cyclic Redundancy Check |
| DAS | Direct Attached Storage |
| DDR | Double-Data-Rate |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | external Serial Advanced Technology Attachment |
| GPS | Global Positioning System |
| HDD | Hard Disk Drive |
| I/O | Input/Output |
| IC | Integrated Circuit |
| IDE | Integrated Drive Electronics |
| JPEG | Joint Photographic Experts Group |
| LAN | Local Area Network |
| LBA | Logical Block Address |
| LDPC | Low-Density Parity-Check |
| LPN | Logical Page Number |
| MLC | Multi-Level Cell |

-continued

| Acronym | Description |
| --- | --- |
| MMC | MultiMediaCard |
| MPEG | Moving Picture Experts Group |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| POS | Point Of Sale |
| RAID | Redundant Array of Inexpensive/Independent Disks |
| RASIE | Redundant Array of Silicon Independent Elements |
| ReRAM | Resistive Random Access Memory |
| RS | Reed-Solomon |
| SAN | Storage Attatched Network |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDR | Single-Data-Rate |
| SLC | Single-Level Cell |
| SMART | Self-Monitoring Analysis and Reporting Technology |
| SRAM | Static Random Access Memory |
| SSD | Solid-State Disk/Drive |
| UFS | Unified Flash Storage |
| USB | Universal Serial Bus |
| VF | Virtual Function |
| WAN | Wide Area Network |

Storage address space to NVM address, span, and length mapping/converting is performed by a controller for a solid-state storage system that includes a mapping function to convert a logical block address from a host to an address of a smallest read unit of the NVM. The mapping function provides span and length information corresponding to the logical block address. The span information specifies a number of contiguous smallest read units to read to provide data (corresponding to the logical block address) to the host. The length information specifies how much of the contiguous smallest read units relate to the data provided to the host. The converted address and the length information are unable to improve recycling of no longer needed (e.g. released) portions of the NVM, and usable to facilitate recovery from outages and/or unintended interruptions of service. In various embodiments, the mapping function is implemented via one or more maps.

According to various embodiments, the map is one or more of: a one-level map; a two-level map; a multi-level map; a direct map; an associative map; and any other means of associating the LBAs of the host protocol with the physical storage addresses in the NVM. For example, in some embodiments, a two-level map includes a first-level map that associates a first function of an LBA with a respective address in the NVM of one of a plurality of second-level map pages, and each of the second-level map pages associates a second function of the LBA with a respective address in the NVM of data corresponding to the LBA. In further embodiments, an example of the first function of the LBA and the second function of the LBA are a quotient and a remainder obtained when dividing an LBA by an integer equal to the number of entries included in each of the second-level snap pages. The plurality of second-level map pages is collectively termed a second-level map. Herein, references to one or more entries of a map refers to one or more entries of any type of map, including a one-level map, a first-level of a two-level map, a second-level of a two-level map, any level of a multi-level map, or any other type of map having entries.

According to various embodiments, each of the map pages of a second-level map (or a lower-level of a multi-level map) one or more of: includes a same number of entries as others of the map pages; includes a different number of entries than at least some others of the map pages; includes entries of a same granularity as others of the map pages; includes entries of a different granularity than others of the map pages; includes entries that are all of a same granularity; includes entries that are of multiple granularities; includes a respective header specifying a format and/or layout of contents of the map page; and has any other format, layout, or organisation to represent entries of the map page. For example, a first second-level map page has a specification of a granularity of 4 KB per entry, and a second second-level map page has a specification of a granularity of 8 KB per entry and only one half as many entries as the first second-level map page.

In further embodiments, entries of a higher-level map include the format and/or layout inform a turn of the corresponding lower-level map pages. For example, each of the entries in a first-level map includes a granularity specification for entries in the associated second-level map page.

In some embodiments, the map includes a plurality of entries, each of the entries associating one or more LBAs with information selectively including a respective location in the NVM where data of the LBAs is stored. For example, LBAs specify 512 B sectors, and each entry in the map is associated with an aligned eight-sector (4 KB) region of the LBA.

According to various embodiments, the information of the entries of the map includes one or more of: a location in the NVM; an address of a read unit in the NVM; a number of read units to read to obtain data of associated LBAs stored in the NVM; a size of the data of the associated LBAs stored in the NVM, the size having a granularity that is optionally and/or selectively larger than one byte; an indication that the data of the associated LBAs is not present in the NVM, such as due to the data of the associated LBAs being trimmed; a property of the data of the associated LBAs; and any other meta-data, property, or nature of the data of the associated LBAs.

In some embodiments, addresses in the NVM are grouped into regions to reduce a number of bits required to represent one of the addresses. For example, if LBAs of the I/O device are divided into 64 regions, and the NVM is divided into 64 regions, one for each of the LBA regions, then a map entry associated with a particular LBA requires six fewer address bits since one of the regions in the NVM is able to be determined by the region of the particular LBA. According to various embodiments, an association between regions of the LBAs and regions of the NVM is by one or more of: equality; a direct association, such as 1-to-1 numeric function; a table look-up; a dynamic mapping; and any other method for associating two sets of numbers.

In various embodiments, the location in the NVM includes an address of one of a plurality of read units, and a length and/or a span in read units. The length is a size of a particular one of a plurality of data items stored in the NVM, the particular data item associated with the entry of the map including the length. According to various embodiments, the length has a granularity of one or more of: one byte; more than one byte; one read unit; a specified fraction of a read unit; a granularity according to a maximum allowed compression rate of one of the data items; and any other granularity used to track storage usage. The span is an integer number of reads units storing the particular data item, e.g., the particular data item is accessed via accessing the number of read units. In further embodiments and/or usage scenarios, a first read unit in the span of read units and/or a last read unit in the span of read units optionally and/or selectively store some or all of multiple ones of the data items. In some embodiments and/or usage scenarios, the length and/or the span are stored encoded, such as by storing the span (sometimes termed size in a context with length and/or span encoded) as an offset from the length. In some embodiments and/or usage scenarios, unused encodings of the length and/or the span encode additional information, such as an indication as to whether an associated data item is present in the NVM.

Encoding the location in the NVM as an address and length-related information enables data stored in the NVM to vary in size. In some embodiments, the length is stored as a fixed-point number $<X,Y>$ where X is an integer part and Y is a fractional part. In further embodiments, the length is stored as a tuple $<X,Y, S>$ where X,Y is a fixed-point number representing the length, S is a "span indication," and the span is encoded as X+S. According to various embodiments, S is a 1-bit number representing 0 or 1; S is a 2-bit number representing 1, 0, or 1; S is an N-bit signed or unsigned number; and S is a signed or unsigned number stored offset by a predetermined amount.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1) A method comprising:
first mapping each of a plurality of pages in a storage address space to a respective address of one of a plurality of smallest quantities of correctable data readable from a non-volatile memory;
second mapping each of the pages to a respective span specifying an integer number of the smallest quantities of correctable data readable from the non-volatile memory;
third mapping each of the pages to a respective length in units having a finer granularity than the smallest quantities of correctable data readable from the non-volatile memory;
reading data stored in the non-volatile memory and associated with a particular one of the pages based at least in part on the respective address and the respective span of the particular page;
in response to writing the data associated with the particular page, updating space usage information of the non-volatile memory based at least in part on the respective length of the particular page; and
wherein one or more of the smallest quantifies of correctable data readable from the non-volatile memory specified by the respective address and the respective span of the particular page contemporaneously store both the data associated with the particular page and at least some data associated with at least one other of the pages.

EC2) The method of EC1,
further comprising accessing a particular one of a plurality of entries of a map table, the map table associating each of the pages with a respective one of the map table entries, the particular page being associated with the particular map table entry; and
wherein the accessing comprises the first mapping of the particular page, the second mapping of the particular page, and the third mapping of the particular page.

EC3) The method of EC2, wherein the particular map entry comprises the respective address, and the respective length.

EC4) The method of EC1, wherein the units are of a coarser granularity than units of a single byte.

EC5) The method of EC1,
wherein the non-volatile memory comprises a plurality of separately writable non-volatile memory pages; and
wherein each of the separately writable non-volatile memory pages comprises at least some of the smallest quantities of correctable data readable from the non-volatile memory.

EC6) The method of EC1, wherein the reading the data comprises parsing a header stored in the one or more of the smallest quantities of correctable data readable from the non-volatile memory specified by the respective address and the respective span of the particular page, the header comprising an offset of the data stored in the non-volatile memory and associated the particular page within the one or more of the smallest quantities of correctable data readable from the non-volatile memory specified by the respective address and the respective span of the particular page.

EC7) The method of EC1, further comprising in response to the writing the data associated with the particular page, updating the respective length of the particular page according to a length of the data associated with the particular page.

EC8) The method of EC7, wherein the writing the data associated with the particular page comprises reducing a size of the data associated with the particular page, and the respective length of the particular page is according to a length of the reduced size of the data associated with the particular page.

EC9) The method of EC8, wherein the reducing comprises compressing.

EC10) The method of EC8, further comprising, in response to the writing the data associated with the particular page, updating the respective span of the particular page according to a number of the smallest quantities of correctable data readable from the non-volatile memory to access for retrieval of the reduced data associated with the particular page.

EC11) The method of EC1, further comprising, in response to the writing the data associated with the particular page, updating the respective span of the particular page according to a number of the smallest quantities of correctable data readable from the non-volatile memory to access for retrieval of the data associated with the particular page.

EC12) The method of EC1, wherein a size of data associated with a first one of the pages is different from a size of data associated with a second one of the pages.

EC13) The method of EC1, wherein the respective length of a first one of the pages is different from the respective length of a second one of the pages.

EC14) The method of EC1, wherein the respective span of a first one of the pages is different from the respective span of a second one of the pages.

EC15) The method of EC1, wherein the respective address of a first one of the pages is equal to the respective address of data associated with a second one of the pages.

E16) A method comprising:
first mapping each of a plurality of pages in a storage address space to a respective address of one of a plurality of read quanta, each of the read quanta being a smallest quantity of correctable data readable from a non-volatile memory;
second mapping each of the pages to a respective span specifying an integer number of the read quanta;
third mapping each of the pages to a respective length in units having a finer granularity than any of the smallest correctable read quanta;
reading data stored in the non-volatile memory and associated with a particular one of the pages, based at least in part on the respective address and the respective span of the particular page;
in response to writing the data associated with the particular page, updating space usage information of the non-volatile memory based at least in part on the respective length of the particular page; and
wherein the respective address and the respective span of the particular page specify particular ones of the read quanta accessed by the reading the data, and at least one of the particular read quanta contains at least some of the data associated with the particular page and at least some data associated with one other of the pages.

EC17) A method comprising:
determining, based at least in part on a page address of a particular one of a plurality of pages in a storage space address, a read unit address of one of a plurality of read units of one or more non-volatile memories;
determining, based at least in part on the page address, a span specifying an integer number of the read units;
determining, based at least in part on the page address, a length in units having a finer granularity than the read units;
reading data associated with the particular page based at least in part on the read unit address and the span, the reading comprising accessing N integer ones of the read units, and wherein N is based at least in part on the span;
in response to writing the data, updating space usage information of the non-volatile memory based at least in part on the length;
wherein each of the read units is a smallest quanta of correctable data readable from the non-volatile memories; and
wherein at least one of the N integer ones of the read units contains at least some of the data associated with the particular page and at least some data associated with at least one other of the pages.

EC18) The method of EC17, wherein N is equal to the span.

EC19) The method of EC17, wherein:
the determining the read unit address comprises mapping each of the pages to respective read unit addresses of respective ones of the read units, the read unit address being the respective read unit address the particular page is mapped to;
the determining the span comprises mapping each of the pages to respective spans specifying respective integer numbers of the read units, the span being the respective span the particular page is snapped to; and the determining the length comprises mapping each of the pages to respective lengths in units having a finer granularity than the read units, the length being the respective length the particular page is mapped to.

EC20) The method of EC19, further comprising accessing a particular one of a plurality of entries of a map table, the map table associating each of the pages with a respective one of the map table entries, the particular page being associated with the particular map table entry; and wherein the accessing comprises the mapping the particular page to the read unit address, the mapping the particular page to the span, and the mapping the particular page to the length.

EC21) The method of EC20, wherein the particular map entry comprises the respective span, the respective address, and the respective length.

EC22) The method of EC17, wherein the length units are of a coarser granularity than units of a single byte.

EC23) The method of EC17, wherein the non-volatile memories comprise a plurality of separately writable non-volatile memory pages; and wherein each of the separately writable non-volatile memory pages comprises a plurality of the read units.

EC24) The method of EC17, wherein the reading the data comprises parsing a header comprised in the accessed read units, the header comprising, an offset identifying the data associated with the particular page.

EC25) The method of EC17, further comprising, in response to the writing the data, updating the length according to a length of the data associated with the particular page.

EC26) The method of EC25, wherein the writing the data comprises reducing a size of the data associated with the particular page, and the respective length of the particular page is according to a length of the reduced size of the data associated with the particular page.

EC27) The method of EC26, wherein the reducing comprises compressing.

EC28) The method of EC26, further comprising, in response to the writing the data, updating the respective span of the particular page according to a number of the read units to access for retrieval of the reduced data associated with the particular page.

EC29) The method of EC17, further comprising, in response to the writing the data, updating the respective span of the particular page according to a number of the read units to access for retrieval of the data associated with the particular page.

EC30) The method of EC17, wherein a size of data associated with a first one of the pages is different from a size of data associated with a second one of the pages.

EC31) The method of EC17, wherein the length is different from a length of one of the pages other than the particular page.

EC32) The method of EC17, wherein the span is different from a span of one of the pages other than the particular page.

EC33) The method of EC17, wherein the read unit address is equal to a read unit address of one of the pages other than the particular page.

EC34) The method of EC33, wherein the length is not equal to a length of the one of the pages other than the particular page.

EC35) The method of EC34, wherein the span is equal to a span of the one of the pages other than the particular page.

EC36) A system comprising:

a mapping module enabled to receive a host storage space address, and to convert the host address to a read unit address of an NVM, and encoded length information; and a recycling module enabled to use the read unit address, and the encoded length information to recover unused space of the NVM, and to maintain counts of free and/or used space of the NVM.

EC37) The system of EC36, further comprising means for decoding the encoded length information to obtain a length and a span, the length having a value expressed in units of a predetermined number of bytes, and the span having a value expressed in units of a predetermined number of read units.

EC38) The system of EC37, wherein each of the read units is a specified number of bytes.

EC39) The system of EC37, wherein the predetermined number of bytes is equal to the number of bytes in a fixed-length read unit, and the length has a numerical value expressed in the read units.

EC40) The system of EC37, wherein the span is expressed with a granularity coarser than a granularity of the length.

EC41) The system of EC37, further comprising a scheduling module enabled to use the read unit address and the span to schedule access to a number of contiguous read units of the NVM, the number being equal to the span, and the span specifying a number of bytes greater than or equal to a number of bytes specified by the length.

EC42) The system of EC36, wherein the mapping module further comprises a single-level map.

EC43) The system of EC37, wherein the mapping module further comprises a dual-level map.

EC44) The system of EC43, wherein the dual-level map comprises a first-level map and a second-level map, and further wherein the second-level map is partitioned into second-level map pages, a second-level map page having a predetermined integer number of map page entries.

EC45) The system of EC44, further comprising an integer divider enabled to provide information usable to select first and second-level map pages and map page entries.

EC46) The system of EC45, wherein the integer divider is enabled to divide the host storage space address by the integer number of entries in a second level map page, and is further enabled to produce an integer quotient and an integer remainder, the integer quotient is enabled to select a first-level map entry, a portion of the first-level map entry is enabled to select a second-level map page, and the integer remainder is enabled to select an entry within the selected second-level map page, the entry with in the selected second-level map page is enabled to select a number of contiguous read units of the NVM, and the number is equal to the span.

EC47) The system of EC36, wherein the mapping module further comprises at least a three-level map.

EC48) The system of EC37, wherein the length is encoded as a fixed-point number having an integer portion and a fractional portion, such as <X,Y>.

EC49) The system of EC48, wherein the length and the span are encoded as first and second sub-fields of the encoded length information, one sub-field comprising the fixed-point length, <X,Y>, and the other sub-field comprising a span offset, S.

EC50) The system of EC49, wherein the span has a value equal to a sum of the integer portion of the length and the value of the span offset, such that span equals X+S.

EC51) The system of EC49, wherein the span has a value equal to a sum of the integer portion of the length, the integer 1, and the value of the span offset, such that span equals X+1+S.

EC52) The system of EC49, wherein the span has a value equal to a sum of the integer portion of the length, the integer 2, and the value of the span offset, such that span equals X+2+S.

EC53) The system of EC49, wherein the span offset has an integer value selected from the set {−1, 0, 1}.

EC54) The system of EC49, wherein the span offset has an integer value selected from the set {0, 1}.

EC55) The system of EC49, wherein the span offset has an integer value selected from the set {0, 1, 2}.

EC56) The system of EC37, wherein the span is represented in the encoded length information by a positive integer number of read units and the length is represented by a length offset.

EC57) The system of EC56, wherein the length offset is represented by a fixed-point non-negative real number having an integer portion and a fractional portion, such as <M·N>.

EC58) The system of EC56, wherein the value of the length is obtained by subtracting the length offset from the span, such that length equals (span−M·N).

EC59) The system of EC36, wherein the mapping module and the recycling module are implemented as part of an SSD using NVM, such as flash memories.

EC60) The system of EC59, wherein the mapping module and the recycling module are implemented as part of a single integrated circuit comprising an SSD controller.

EC61) The system of EC60, wherein the SSD controller is used to control a solid-state disk using NVM, such as flash memories.

EC62) The system of EC61, wherein the flash memories are comprised of a plurality of die.

EC63) The system of EC59, further comprising a means for interfacing the SSD with a computing host.

EC64) The system of EC63, wherein the means for interfacing the SSD with the computing host is compatible with a storage interface standard.

EC65) The system of EC59, further comprising means for interfacing with the flash memories.

EC66) The system of EC65, wherein the means for interfacing with the flash memories comprises a flash memory interface.

EC67) The system of EC59, further comprising:
a means for interfacing the SSD with the computing host; and
a means for interfacing with the flash memories.

EC68) The system of EC67, wherein the means are collectively implemented in a single Integrated Circuit (IC).

EC69) The system of EC67, wherein the means are comprised in a Solid-State Disk (SSD).

EC70) The system of EC67, further comprising all or any portions of the computing host.

EC71) A system comprising:
a mapping table enabled to associate a logical page address with an address of one of a plurality of read units of an NVM, and with encoded length information; and
a recycler enabled to use the read unit address, and the encoded length information to determine specific blocks of the NVM to recycle.

EC72) The system of EC71, further comprising means for decoding the encoded length information to obtain a length and a span, the length having a value expressed in units of a predetermined number of bytes, and the span having a value expressed in units of a predetermined number of read units.

EC73) The system of EC72, wherein each of the read units is a specified number of bytes.

EC74) The system of EC72, wherein the predetermined number of bytes is equal to the number of bytes in a fixed-length, read, unit, and the length has a numerical value expressed in the read units.

EC75) The system of EC72, wherein, the length is a non-integer number of read units, and is expressed with a granularity finer than a single read unit.

EC76) The system of EC72, wherein the span is expressed with a granularity coarser than a granularity of the length.

EC77) The system of EC72, further comprising a scheduler enabled to use the read unit address and the span to access a contiguous number of read units, beginning with the read unit located in the NVM at the read unit address, and continuing for a total equal to the span.

EC78) The system of EC71), whereas the mapping table further comprises a single-level map.

EC79) The system of EC72, wherein the mapping table further comprises a dual-level map.

EC80) The system of EC79, wherein the dual-level map comprises a first-level map and a second-level map, and further wherein the second-level map is partitioned into second-level map pages, a second-level map page having a predetermined integer number of map page entries.

EC81) The system of EC80, further comprising an integer divider enabled to provide information usable to select first and second-level map pages and map page entries.

EC82) The system EC81, wherein the integer divider is enabled to divide the logical page address by the integer number of entries in a second level map page, and is further enabled to produce an integer quotient and an integer remainder, the integer quotient is enabled to select a first-level map entry, a portion of the first level map entry is enabled to select a second-level map page, and the integer remainder is enabled to select an entry within the selected second-level map page, the entry within the selected second-level map page is enabled to select a number of contiguous read units of the NVM, and the number is equal to the span.

EC83) The system of EC71, wherein the mapping table further comprises at least a three-level map.

EC84) The system of EC72, wherein the length is encoded as a fixed-point number having an integer portion and a fractional portion, such as <X,Y>.

EC85) The system of EC84, wherein the length and the span are encoded as a tuple comprising the fixed-point length representation, <X,Y>, and a span offset, S.

EC86) The system of EC85, wherein the length and the span are encoded as first and second sub-fields of the encoded length information, one sub-field comprising the fixed-point length, <X,Y>, and the other sub-field comprising the span offset, S.

EC87) The system of EC86, wherein the span has a value equal to a sum of the integer portion of the length and the value of the spun offset, such find span equals X+S.

EC88) The system of EC86, wherein the span has a value equal to a sum of the integer portion of the length, the integer 1, and the value of the span offset, such that span equals X+1+S.

EC89) The system of EC86, wherein the span has a value equal to a sum of the integer portion of the length, the integer 2, and the value of the span offset, such that span equals X+2+S.

EC90) The system of EC86, wherein the span offset has an integer value selected from the set {−1, 0, 1}.

EC91) The system of EC86, wherein the span offset has an integer value selected from the set {0, 1}.

EC92) The system of EC86, wherein the span offset has an integer value selected from the set {0, 1, 2}.

EC93) The system of EC72, wherein the span is represented in the encoded length information by a positive integer number of read units and the length is represented by a length offset.

EC94) The system of EC93, wherein the length offset is represented by a fixed-point non-negative real number having an integer portion and a fractional portion, such as <M·N>.

EC95) The system of EC93, wherein the value of the length is obtained by subtracting the length offset from the span, such as length equals (span−M·M).

EC96) The system of EC71, wherein the mapping module and the recycling module are implemented as part of an SSD using NVM, such as flash memories.

EC97) The system of EC71, wherein the mapping module and the recycling module are implemented as part of a single integrated circuit comprising an SSD controller.

EC98) The system of EC97, wherein the SSD controller is used to control a solid-state disk using NVM, such as flash memories.

EC99) The system of EC98, wherein, the flash memories are comprised of a plurality of die.

EC100) The system of EC96, further comprising a means for interfacing the SSD with a computing host.

EC101) The system of EC100, wherein the means for interfacing the SSD with the computing host is compatible with a storage interface standard.

EC102) The system of EC96, further comprising means for interfacing with the flash memories.

EC103) The system of EC102, wherein the means for interfacing with the flash memories comprises a flash memory interface.

EC104) The system of EC96, further comprising:
a means for interfacing the SSD with the computing host; and
a means for interfacing with the flash memories.

EC105) The system of EC104, wherein the means are collectively implemented in a single Integrated Circuit (IC).

EC106) The system of EC104, wherein the means are comprised in a Solid-State Disk (SSD).

EC107) The system of EC104, further comprising all or any portions of the computing host.

EC108) A method comprising:
determining, based at least in part on a host storage space address, as element describing a transfer amount value in units of a transfer amount granularity, and a space amount value in units of a space amount granularity;
determining, based at least in part on the element, the transfer amount value, and the space amount value;
reading, from a Non-Volatile Memory (NVM), data corresponding to the host storage space address, based at least in part on the transfer amount value;
tracking space usage information of the NVM based at least in part on the space amount value; and
wherein the transfer amount granularity is coarser than the space amount granularity.

EC109) The method of EC108, wherein the determining of the element is at least in part via a mapping module enabled to provide, based at least in part on the host storage space address, the element and a starting address of the data in the NVM.

EC110) The method of EC109 wherein the reading of the date reads data from the NVM beginning at the starting address.

EC111) The method of EC109, wherein the starting address has a granularity corresponding to a smallest quanta of error-correctable data readable from the NVM.

EC112) The method of EC111, wherein the smallest quanta of error-correctable data readable from the NVM corresponds to a raw data portion and a check bits portion protecting the raw data portion.

EC113) The method of EC108, wherein the transfer amount value represents an integer multiple of a smallest quanta of error-correctable data readable from the NVM.

EC114) The method of EC113, wherein the smallest quanta of error-correctable data readable from the NVM corresponds to a raw data portion and low-level error-correction code bits associated with the raw data portion.

EC115) The method of EC113, wherein a first sub-element of the element comprises the transfer amount value and a second sub-element of the element comprises the space amount value.

EC116) The method of EC113, wherein a first sub-element of the element comprises an integer indicating the transfer amount value and a second sub-element of the element comprises a fraction indicating an amount of data less than the smallest quanta of error-correctable data readable from the NVM, and the integer and the fraction in combination correspond to the space amount value.

EC117) The method of EC107, further comprising managing recycling respective portions of the NVM based at least in part on the space amount value.

EC118) The method of EC117, further comprising determining an amount of used space for a particular one of the respective portions based at least in part on the space amount value.

EC119) The method of EC118, further comprising selecting the particular one of the respective portions for recycling based at least in part on the amount of used space.

EC120) The method of EC108, further comprising transforming at least a portion of the data and returning at least a portion of results of the transforming to the host in response to a read request from the host that specifies the host storage space address.

EC121) The method of EC120, wherein the transforming comprises uncompressing.

EC122) The method of EC120, wherein the transforming comprises decrypting.

EC123) A tangible non-transitory computer readable medium having a set of instructions stored therein that when executed by a processing element cause the processing element to perform operations comprising:
determining, based at least in part on a host storage space address, an element describing a transfer amount value in units of a transfer amount granularity, and a space amount value in units of a space amount granularity;
determining, based at least in part on the element, the transfer amount value, and the space amount value;
reading, from a Non-Volatile Memory NVM data corresponding to the host storage space address, based at least in part on the transfer amount value;
tracking space usage information of the NVM based at least in part on the space amount value; and
wherein the transfer amount granularity is coarser than the space amount granularity.

EC124) The tangible non-transitory computer readable medium of EC123, wherein the determining of the element is at least in part via a mapping module enabled to provide, based at least in part on the host storage space address, the element and a starting address of the data in the NVM.

EC125) The tangible non-transitory computer readable medium of EC124, wherein the reading of the data reads data from the NVM beginning at the starting address.

EC126) The tangible non-transitory computer readable medium of EC124, wherein the starting address has a granularity corresponding to a smallest quanta of error-correctable data readable from the NVM.

EC127) The tangible non-transitory computer readable medium of EC126, wherein the smallest quanta of error-correctable data readable from the NVM corresponds to a raw data portion and a check bits portion protecting the raw data portion.

EC128) The tangible non-transitory computer readable medium of EC123, wherein the transfer amount value represents an integer multiple of a smallest quanta of error-correctable data loadable from the NVM.

EC129) The tangible non-transitory computer readable medium of EC128, wherein the smallest quanta of error-correctable data readable from the NVM corresponds to a raw data portion and low-level error-correction code bits associated with the raw data portion.

EC130) The tangible non-transitory computer readable medium of EC128, wherein a first sub-element of the element composes the transfer amount value and a second sub-element of the element comprises the space amount value.

EC131) The tangible non-transitory computer readable medium of EC128, wherein a first sub-element of the element comprises an integer indicating the transfer amount value and a second sub-element of the element comprises a fraction indicating an amount of data less than the smallest quanta of error-correctable data readable from the NVM, and the integer and the fraction in combination correspond to the space amount value.

EC132) The tangible non-transitory computer readable medium of EC123, further comprising managing recycling respective portions of the NVM based at least in part on the space amount value.

EC133) The tangible non-transitory computer readable medium of EC132, further comprising determining an amount of used space for a particular one of the respective portions based at least in part on the space amount value.

EC134) The tangible non-transitory computer readable medium of EC132, further comprising selecting the particular one of the respective portions for recycling based at least in part on the amount of used space.

EC135) The tangible non-transitory computer readable medium of EC123, further comprising transforming at least a portion of the data and returning at least a portion of results of the transforming to the host in response to a read request from the host that specifies the host storage space address.

EC136) The tangible non-transitory computer readable medium of EC135, wherein the transforming comprises uncompressing.

EC137) The tangible non-transitory computer readable medium of EC135, wherein the transforming comprises decrypting.

EC138) The tangible non-transitory computer readable medium of EC123, wherein the operations further comprise managing interfacing the requests with the computing host.

EC139) The tangible non-transitory computer readable medium of EC138, wherein the interfacing the requests with the computing host is compatible with a storage interface standard.

EC140) The tangible non-transitory computer readable medium of EC123, wherein the storing comprises interfacing with the flash memories.

EC141) The tangible non-transitory computer readable medium of EC140, wherein the interfacing with the flash memories comprises a flash memory interface.

EC142) The tangible non-transitory computer readable medium of EC123, wherein the operations further comprise:
  managing interfacing the requests with the computing host at least in part via managing computing host interface logic circuitry; and
  wherein the storing is at least in part via flash memory interface logic circuitry enabled to interface with the flash memories.

EC143) The tangible non-transitory computer readable medium of EC142, wherein the computing host interface logic circuitry and the flash memory interface logic circuitry are collectively implemented in a single Integrated Circuit (IC).

EC144) The tangible non-transitory computer readable medium of EC142, wherein the computing host interface logic circuitry and the flash memory interface logic circuitry are comprised in a Solid-State Disk (SSD).

EC145) The tangible non-transitory computer readable medium of EC123, wherein the operations further comprise managing operating all or any portions of the computing host.

EC146) The tangible non-transitory computer readable medium of EC123, wherein the operations further comprise managing operating at least one of the flash memories.

EC147) Any of the foregoing ECs having or referring to a storage interface standard, wherein the storage interface standard comprises one or more of
  a Universal Serial Bus (USB) interface standard,
  a Compact Flash (CF) interface standard,
  a MultiMediaCard (MMC) interface standard,
  an embedded MMC (eMMC) interface standard,
  a Thunderbolt interface standard,
  a UFS interface standard,
  a Secure Digital (SD) interface standard,
  a Memory Stick interface standard,
  an xD-picture card interface standard,
  an Integrated Drive Electronics (IDE) interface standard,
  a Serial Advanced Technology Attachment (SATA) interface standard,
  an external SATA (eSATA) interface standard,
  a Small Computer System Interface (SCSI) interface standard,
  a Serial Attached Small Computer System Interface (SAS) interface standard,
  a Fibre Channel interface standard,
  an Ethernet interface standard, and
  a Peripheral Component Interconnect express (PCIe) interface standard.

EC148) Any of the foregoing ECs having or referring to a flash memory interface, wherein the flash memory interface is compatible with one or more of
  an Open NAND Flash Interface (ONFI),
  a Toggle-mode interface,
  a Double-Data-Rate (DDR) synchronous interface,
  a DDR2 synchronous interface;
  a synchronous interface, and
  an asynchronous interface.

EC149) Any of the foregoing ECs having or referring to a computing host, wherein the computing host comprises one or more of a computer,
a workstation computer,
a server computer,
a storage server,
a Storage Attached Network (SAN),
a Network Attached Storage (NAS) device,
a Direct Attached Storage (DAS) device,
a storage appliance,
a Personal Computer (PC),
a laptop computer,
a notebook computer,
a netbook computer,
a tablet device or computer,
an ultrabook computer,
an electronic reading device (an e-reader),
a Personal Digital Assistant (PDA),
a navigation system,
a (handheld) Global Positioning System (GPS) device,
an automotive control system,
an automotive media control system or computer,
a printer, copier or fax machine or all-in-one device,
a Point Of Sale POS device.
a cash register,
a media player,
a television,
a media recorder,
a Digital Video Recorder (DVR),
a digital camera,
a cellular handset,
a cordless telephone handset, and
an electronic game.

EC150) Any of the foregoing ECs having or referring to a at least one flash memory, wherein at least a portion of the at least one flash memory comprises one or more of
NAND flash technology storage cells, and
NOR flash technology storage cells.

EC151) Any of the foregoing ECs having or referring to a at least one flash memory, therein at least a portion of the at least one flash memory comprises one or more of
Single-Level Cell (SLC) flash technology storage cells, and
Multi-Level Cell (MLC) flash technology storage cells.

EC152) Any of the foregoing ECs having or referring to a at least one flash memory, wherein at least a portion of the at least one flash memory comprises one or more of
polysilicon technology-based charge storage cells, and
silicon nitride technology-based charge storage cells.

EC153) Any of the foregoing ECs having or referring to a at least one flash memory, wherein at least a portion of the at least one flash memory comprises one or more of
two-dimensional technology-based flash memory technology, and
three-dimensional technology-based flash memory technology.

System

In some embodiment, an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

In some embodiments, accessing compressed data of varying-sized quanta in NVM provides improved storage efficiency in some usage scenarios. For example, an SSD controller receives (uncompressed) data from a computing host (e.g., relating to a disk write commands), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as an SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

FIG. 1A illustrates selected details of an embodiment of an SSD including an SSD controller implementing storage address space to Non-Volatile Memory (NVM) address, span, and length mapping/converting, using various techniques for encoding location- and length-related information, such as within table entries of an address mapping function (e.g. Map 141 of FIG. 1A), as well as circuitry for managing non-volatile storage, such as flash memories. The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each Flash Device 192 has, in some embodiments, one or more individual Flash Die 194. According to type of a particular one of Flash Device 192, plurality of Flash Die 194 in the particular Flash device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, Hash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, Device Interfaces 190 are organized as: one or more busses with one or more of Flash Device 192 per bus; one or more groups of busses with one or more of Flash Device 192 per bus, where busses in a group are generally accessed in parallel; or any other organisation of one or more of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include write command specifying an address (such as an LBA) and an amount of data such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE), where redundancy is at a flash device (e.g., multiple ones of Flash Device 192) level and/or a flash die (e.g., Flash Die 194) level instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code, a hard-decision code; a soft-decision code, an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) to individual ones of the instances of Flash Device 192 (or Flash Die 194) are available.

Map 341 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and or page addresses targeting one or more Flash Die 194, via mapping provided by Table 143. For LBAs that have never been written since drive manufacture or de-allocation, the Map points to a default value to retain if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identity information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and or monitoring and/or adjusting power consumption; responding to power failures; controlling and or monitoring and/or adjusting clock rates; and other management tasks.

Various embodiments include a computing host flash memory controller that is similar to SSD Controller 100 and is compatible with operation with various computing hosts, such as via adaptation of Host Interfaces 111 and or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-one-one device, a POS device, a cash-register, a media player, a television, a media recorder, a DVR, a digital camera, a cellular handset, a cordless telephone handset, and an electronic game.

In various embodiment, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
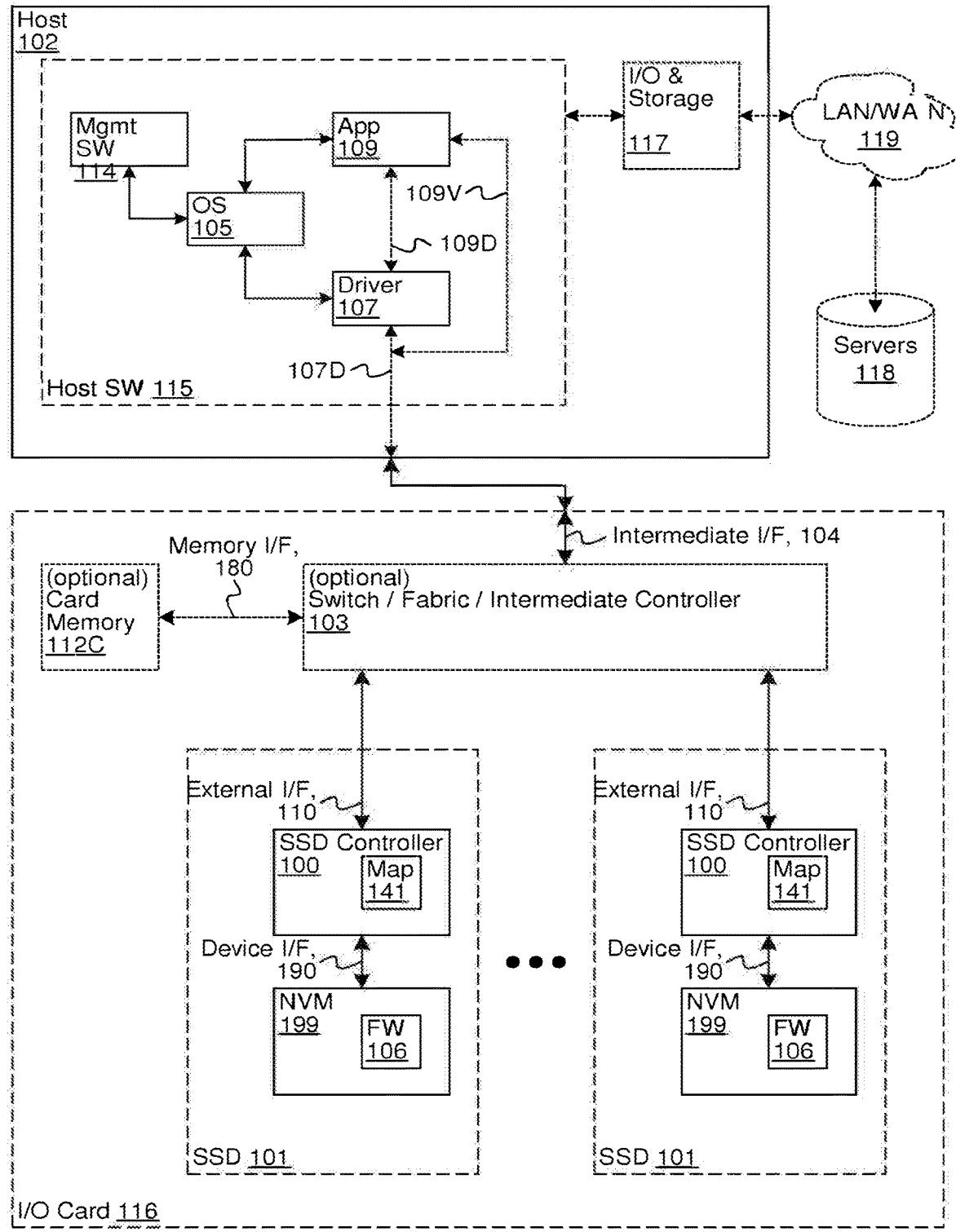
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled, directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 184 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Most Software ← → Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g., Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-though modes to enable application level programs, such as Application 109 via Optimised NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application ← → I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application ← → I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect, to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host via External Interfaces 110. In various embodiments, SSD Controller 100 is coupled to the Host via one or more intermediate levels of other controllers, such as a RAID controller. In some embodiments, SSID 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such some of the embodiments where Host 102 is a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices Resources 117 and optional LAN/WAN 119) with one or more local and/or remote servers (e.g. optional Servers 118). The communication enables, for example, local and/or remote access, management, and or usage of any one or more of SSD 101 elements. In some embodiments, the communication is wholly or partially via Ethernet. In some embodiments, the communication is wholly or partially via fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof, for example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Mapping Operation

Figure 2:
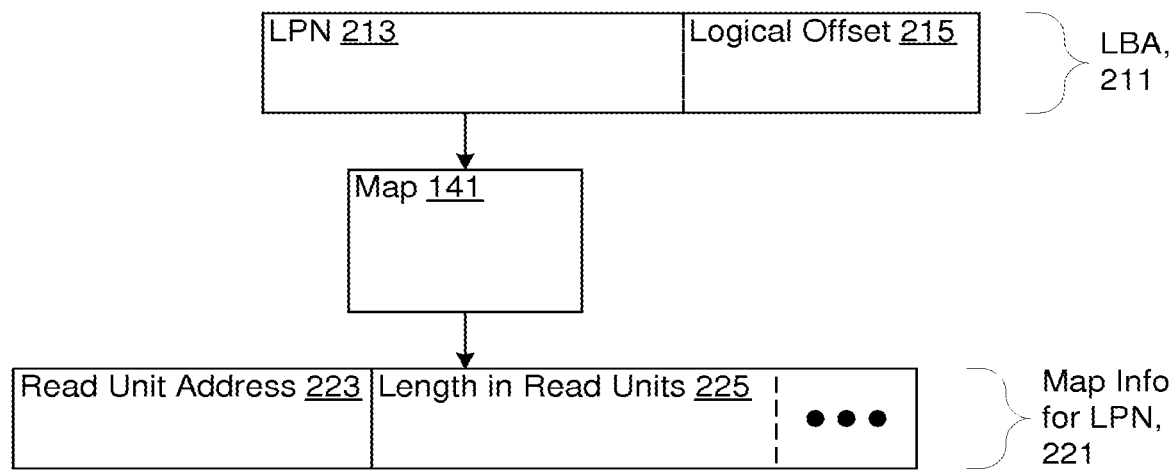
FIG. 2 illustrates selected details of an embodiment of mapping a Logical Page Number (LPN) portion of a Logical Block Address (LBA).

FIG. 2 illustrates selected details of an embodiment of mapping an LPN portion of an LBA. In some embodiments, a read unit is a finest granularity of an NVM that is independently readable, such as a portion of a page of the NVM. In further embodiments, the read unit corresponds to check bits (sometimes-termed redundancy) of a (lower-level) error-correcting code along with all data protected by the check bits. For example, ECC 161 of FIG. 1A implements error concision via check bits such as via an LDPC code, and a read and corresponds to coding bits implementing the LDPC code in addition to data bits protected by the LDPC coding bits.

In some embodiments, Map 141 maps LPN 213 portion of LBA 211 to Map Info for LPN 221, such as via Table 143 (as illustrated in FIG. 1A). Map info for an LPN (such as Map Info for LPN 221) is sometimes termed a map entry. Map 141 is said to associate an LPN with a corresponding map entry. In various embodiments, mapping is via one or more associative look-ups, via one or more non-associative look-ups, and/or via one or more other techniques.

In some embodiments, SSD Controller 100 maintains one map entry for each LPN potentially and/or actively in use.

In some embodiments, Map Info for LPN 221 includes respective Read Unit Address 223 and Length in Read Units 225. In some embodiments, a length and/or a span are stored encoded, such as by storing the length as an offset from the span, e.g. in all or any portions of Length in Read Units 225. In further embodiment, a first LPN is associated with a first map entry, a second LPN (different from the first LPN, but referring to a logical page of a same size as a logical page referred to by the first LPN) is associated with a second map entry, and the respective length in read units of the first map entry is different from the respective length in read units of the second map entry.

In various embodiments, at a same point in time, a first LPN is associated with a first map entry, a second LPN (different from the first LPN) is associated with a second map entry, and the respective read unit address of the first map entry is the same as the respective read unit address of the second map entry. In further embodiments, data associated with the first LPN and data associated with the second LPN are both stored in a same physical page of a same device in NVM 199.

According to various embodiments, Read Unit Address 223 is associated with one or more of: a starting address in the NVM; an ending address in the NVM; an offset of any of the preceding; and any other techniques for identifying a portion of the NVM associated with LPN 213.

Figure 3:
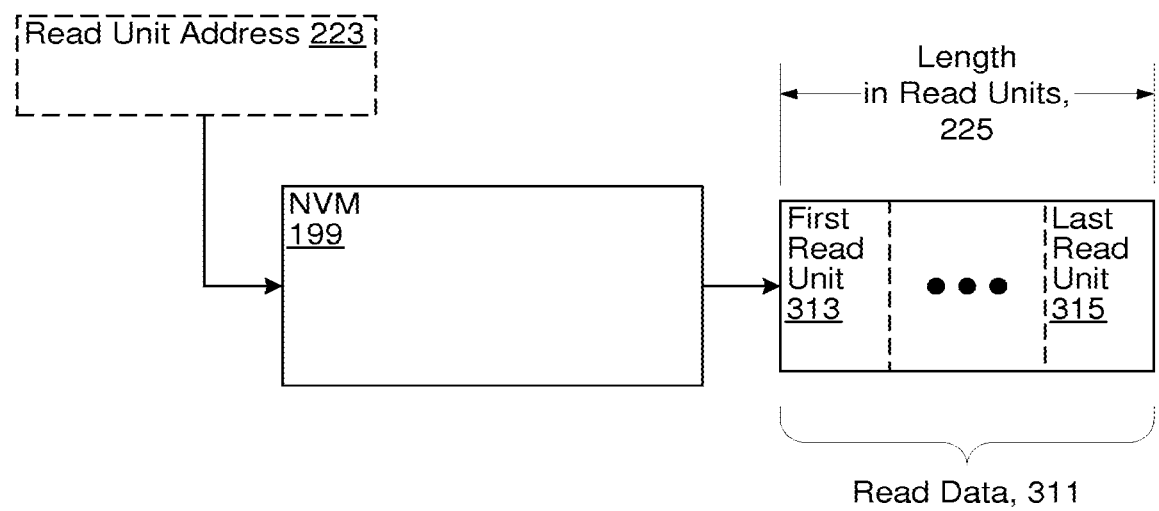
FIG. 3 illustrates selected details of an embodiment of accessing a Non-Volatile Memory (NVM) at a read unit address to produce read data organized as various read units, collectively having a length measured in quanta of read units.

FIG. 3 illustrates selected details of an embodiment of accessing an NVM at a read unit address to produce read data organised as various read units, collectively having a length measured in quanta of read units. According to various embodiments, First Read Unit 313 is one or more of: a one of read units in Read Data 311 with a lowest address in an address space of the NVM; a fixed one of the read units; an arbitrary one of the read units; a variable one of the read units; and a one of the read units selected by any other technique. In various embodiments, SSD Controller 100 is enabled to access NVM 199 and produce Read Data 311 by reading no more than a number of read units specified by length in Read Units 225.

Figure 4A:
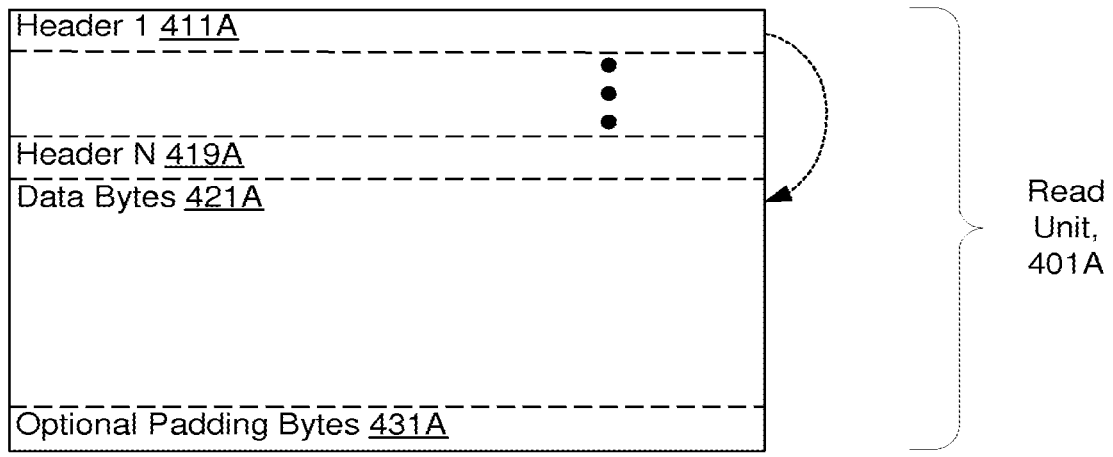
FIG. 4A illustrates selected details of an embodiment of a read unit.

FIG. 4A illustrates selected details of an embodiment of a read unit (such as Read Units 313 or 315 of FIG. 3) as Read Unit 401A. In various embodiments and/or usage scenarios. Header 1 411A through Header N 419A are contiguous, and respective data regions identified (such as via respective offsets) by each of the headers are contiguous following a last one of the headers. The data regions collectively form Data Bytes 421A. The data regions are stored in a location order that matches the location order the headers are stored.

For example, consider a first header, at the beginning of a read unit, with a second header and a third header contiguously following the first header. A first data region identified by a first offset in the first header) contiguously follows the third header. A second data regain (identified by a second offset in the second header) contiguously follows the first data region. Similarly, a third data region (identified by the third header) contiguously follows the second data region.

Figure 4B:
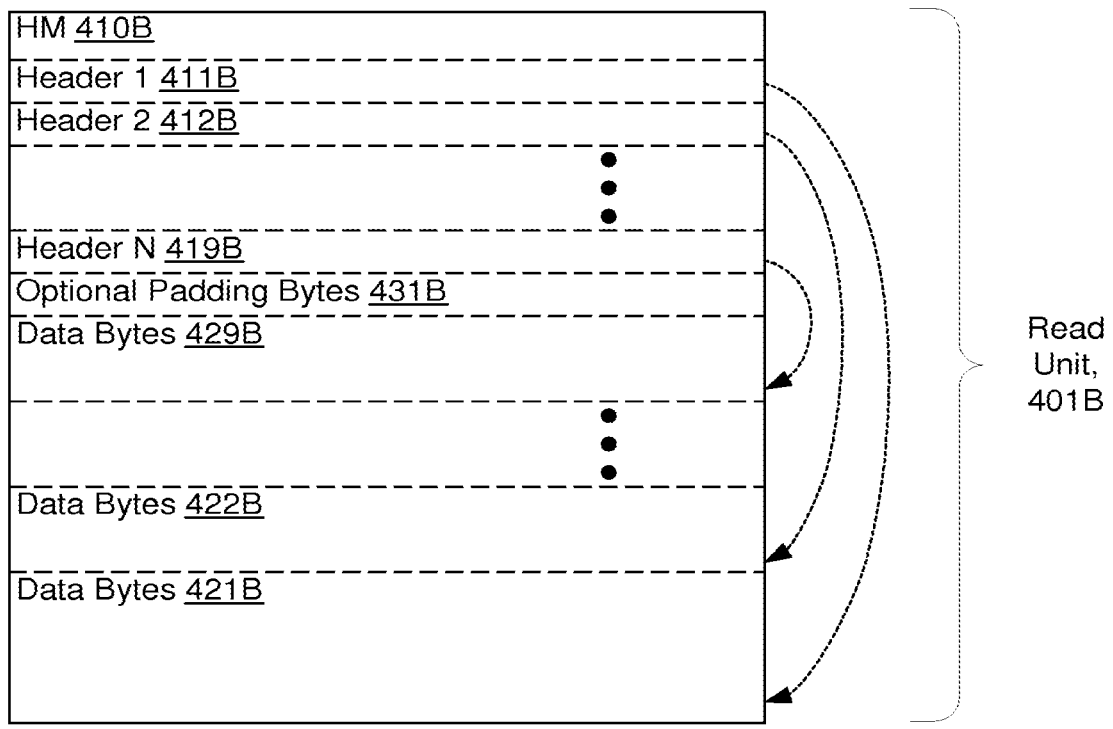
FIG. 4B illustrates selected details of another embodiment of a read unit.

FIG. 4B illustrates selected details of another embodiment of a read unit (such as Read Units 313 or 315 of FIG. 3) as Read Unit 401B. In various embodiments and/or usage scenarios, Header Marker (HM) is an optional initial field (such as a one byte field) indicating a number of following contiguous headers (Header 1 411B, Header 2 412B . . . Header N 419B). Data regions (Data Bytes 421B, Data Bytes 422B . . . Data Bytes 429B) are identified respectively by the headers (Header 1 411B, Header 2 452B . . . Header N 419B) and are stored in a location order that is opposite of the location order that the headers are stored. Headers start at the beginning of a read unit, while corresponding data regions start at the end of a read unit. In some embodiments, data bytes within a data region (e.g. Data Bytes 421B, Data Bytes 422B . . . Data Bytes 429B) are arranged in a forward order (byte order matching location order), while in other embodiments, the data bytes are arranged in a reverse order (byte order reversed with respect to location order). In some embodiments, a header marker is used in read units where headers and data bytes are stored in a same location order (e.g. as illustrated in FIG. 4A).

In some embodiments, Optional Padding Bytes 431A (or 431B) are according to granularity of data associated with a particular LPN. For example, in some embodiments, if Data Bytes 421A (or collectively Data Bytes 421B, Data Bytes 422B . . . Data Bytes 429B) have less than a fixed amount of remaining space, such as 8 bytes, after storing data associated with all but a last one of Header 1 411A through Header N 419A (or Header 1 411B, Header 2 412B . . . Header N 439B), then data for an LPN associated with the last header starts in a subsequent read unit. In further embodiments, a particular offset value (e.g. all ones) in the last header indicates that the data for the LPN associated with the last header starts in the subsequent read unit.

Figure 5:
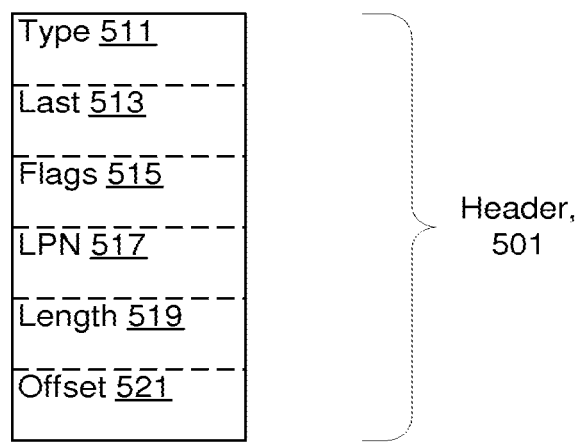
FIG. 5 illustrates selected details of an embodiment of a header having a number of fields.

FIG. 5 illustrates selected details of an embodiment of a header such as any of Header 1 411A through Header N 419A of FIG. 4A or Header 1 411B through Header 419B of FIG. 4B) having a number of fields. In some embodiments, headers are fixed-length (e.g. each header is a same number of bytes long). Header 501 includes fields Type 511, Last Indicator 513, Flags 515, LPN 517, Length 519, and Offset 521. The type field identifies a category of the data bytes. For example, the type field indicates the category of the data bytes is one of host data (e.g. logical page data) or system data (e.g. map information or checkpoint information). The last field indicates that the header is the last header before the data bytes. In some embodiments with a header marker, the last field is optionally omitted. The LPN field is the LPN that the header is associated with. The LPN field enables parsing of the headers to determine a particular one of the headers that is associated with a particular LPN by, for example, searching the headers for one with an LPN field matching the particular LPN. The length field is the length, in bytes, of the data bytes (e.g. how many bytes of data there are in Data Bytes 421A associated with Header 501). In some embodiments, an offset in the offset field is rounded according to a particular granularity (e.g. 8-byte granularity).

In various embodiments, some or all information associated with a particular LPN is stored in a map entry associated with the particular LPN, a header associated with the particular LPN, or both. For example, in some embodiments, some or all of Length 519 is stored in a map entry rather than in a header.

Figure 6:
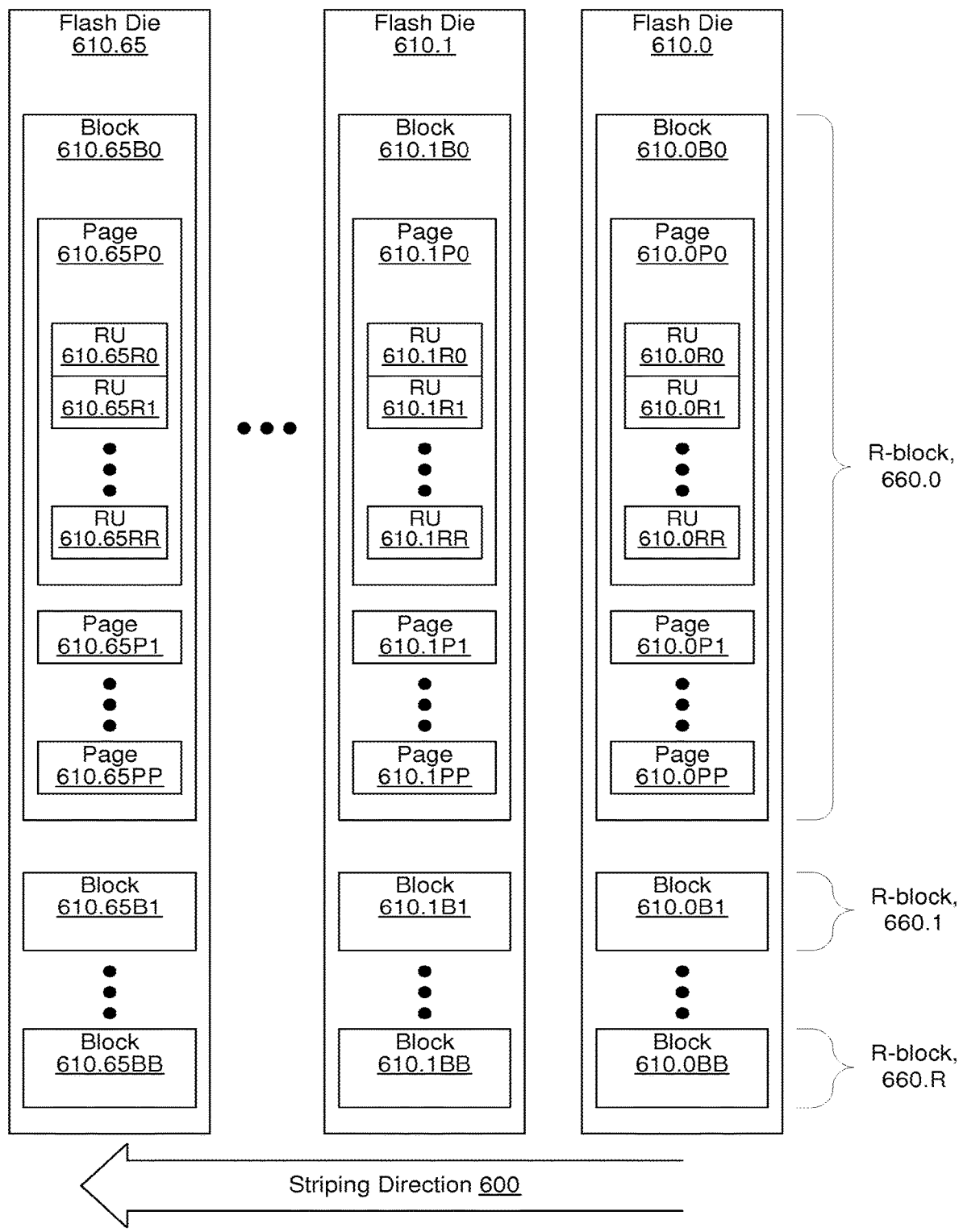
FIG. 6 illustrates selected details of an embodiment of blocks, pages, and read units of multiple NVM devices.

FIG. 6 illustrates selected details of an embodiment of blocks, pages, and read units of multiple NVM devices (e.g. one or more flash die and/or flash chips) managed in logical slices and/or sections. The management functions include any one or more of reading, recycling, erasing, programming/writing, and other management functions. The logical slices and/or sections are sometimes referred to as R-blocks. The figure illustrates an embodiment with 66 flash die. Three of the flash die are explicitly illustrated (Flash Die 610.65, 610.1, and 610.0) and 63 of the flash die are implicitly illustrated (610.64 . . . 610.2).

Each of the flash die (such as any one of Flash Die 610.65 . . . 610.1, and 610.0) provides storage organized as blocks (such as Blocks 610.65BB . . . 610.65B1, and 610.65B0 of Flash Die 610.65, Blocks 610.0BB . . . 610.0B1, and 610.0B0 of Flash Die 610.0; and so forth). The blocks in turn include pages (such as Pages 610.65PP . . . 610.65P1, and 610.65P0 of Block 610.65B0; Pages 610.0PP . . . 610.0PP . . . and 610.0P0 of Block 610.0B0; and so forth). The pages in turn include read units (such as Read Units 610.65RR . . . 610.65R1, and 610.65R0 of Page 610.65P0; Read Units 610.0RR . . . 610.0R1, and 610.0R0 of Page 610.0P0; and so forth).

In some embodiments, each flash die includes an integer number of blocks (e.g. N blocks) and a block is a smallest quantum of erasing. In some embodiments, each block includes an integer number of pages and a page is a smallest quantum of writing. According to various embodiments, one or more of: a read unit is a smallest quantum of reading and error correction; each page includes an integer number of read units; an associated group of two or more pages includes an integer number of read units; and read units optionally and/or selectively span page boundaries.

In various embodiments, various NVM management functions (e.g. reading, recycling, erasing, and/or programming/writing) are performed in units of R-blocks. An R-block is exemplified as a logical slice or section across all die of a flash memory. For example, in a flash memory having R flash die, each flash die having N blocks, each R-block is the $i^{th}$ block from each of the flash die taken together, for a total of N R-blocks. For another example, in a flash memory having R flash die, each with N blocks, each R-block is the $i^{th}$ and $(i+1)^{th}$ block from each of the flash die, for a total of N/2 R-blocks. For yet another example, in a flash memory having a plurality of dual plane devices, each R-block is the $i^{th}$ even block and the $i^{th}$ odd block from each of the dual plane devices.

In various embodiments where blocks are treated in pairs or other associated groups as part of forming an R-block, respective pages from each block of an associated group of the blocks are also treated as a unit, at least for writing, forming a larger multi-block page. For example, continuing the foregoing dual plane example, a first page of a particular one of the even blocks and a first page of an associated one of the odd blocks are treated as a unit for writing, and optionally and or selectively as a unit for reading. Similarly, a second page of the particular even block and a second page of the associated odd block are treated as a unit. According to various embodiments, a page of NVM as used herein refers to one or more of: a single page of NVM; a multi-block page of NVM; a multi-block page of NVM for writing that is optionally and/or selectively treated as one or more individual pages for reading; and any other grouping or association of pages of NVM.

The figure illustrates a plurality of illustrative R-blocks, three of them explicitly (660.0, 660.1, and 660.R). Each illustrative R-block is the $i^{th}$ block from each of the flash die, taken together. E.g. R-block 660.0 is Block 610.65B0 from Flash Die 610.65, block 0 from Flash Die 610.64 (not explicitly illustrated), and so forth to Block 610.1B0 of Flash Die 610.1, and Block 610.0B0 of flash Die 610.0. As there are N blocks per flash die, there are thus a total of N R-blocks (R-block 660.R . . . R-block 660.1, and R-block 660.0).

Another example of an R-block is the $i^{th}$ and $(i+1)^{th}$ block from each of the flash die, taken together (e.g. Blocks 610.65B0 and 610.65B1 from Flash Die 610.65, blocks 0 and 1 from flash Die 610.64 (not explicitly illustrated), and so forth to Blocks 610.1B0 and 610.1B1 from flash Die 610.1, and blocks 610.0B0 and 610.01B1 from Flash Die 610.0). There are thus N/2 R-blocks, if there are N blocks in each flash die. Yet another example of an R-block is the $i^{th}$ even and odd blocks from each of a plurality of dual plane devices. Other arrangements of flash the blocks for management as R-blocks are contemplated, including mapping between virtual and physical block addresses to ensure that R-blocks have one block from each die, even if some blocks are inoperable. In various embodiments, some of the N blocks in each flash die are used as spares so that the mapping between virtual and physical block addresses has spare (otherwise unused) blocks to replace defective ones of the blocks in the R-blocks.

In various embodiments, reads and/or writes of information in flash die are performed according to an order, such as a 'read unit first' order or a 'page first' order. An example of a read unit first order for read units illustrated in the figure begins with Read Unit 610.6R0 followed by 610.1R0 . . . 610.65R1, 610.0R1, 610.1R1 . . . 610.65R1, and so forth, ending with 610.65RR. An example of a page first order for read units illustrated in the figure begins with Read Unit 610.0R0 followed by 610.0R1 . . . 610.0RR, 610.1R0, 610.1R1 . . . 610.1RR . . . 610.65R0, 610.65R1, and so forth, ending with 610.65RR.

In various embodiments, a writing and/or a striping order of data within an R-block is page (e.g. lowest to highest) first, across all devices (e.g. lowest to highest numbered devices, as suggested conceptually by Striping Direction 600), then the next highest page (across all devices), and so forth, continuing throughout the last page of the R-block. Specifically with respect to R-block 660.0, an example order begins with Page 610.0P0 (the first page in the first block of Flash Die 610.0), followed by Page 610.1P0 (the first page in the first block of Flash Die 610.1), and so forth continuing to Page 610.65P0 (the first page in the first block of Flash Die 610.65, and the last block of R-block 660.0). The example order continues with Page 610.0P1 (the second page in the first block of Flash Die 610.0), followed by Page 610.1P1 (the second page in the first block of Flash Die 610.1), and so forth continuing to Page 610.65P1 (the second page in the first block of Flash Die 610.65). The example continues in an identical order. The example order completes with Page 610.0PP (the last page in the first block of Flash Die 610.0), followed by Page 610.1PP (the last page in the first block of Flash Die 610.1 and so forth ending with Page 610.65 PP (the last page in the first block of Flash Die 610.65, and the last page in the last block of R-block 660.0).

In various embodiments, Flash Die 610.65 . . . 610.1, and 610.0 correspond to respective ones of one or more individual Flash Die 194, of FIG. 1A. In some embodiments, Flash Die 610.65 . . . 610.1, and 610.0 are a portion less than all of NVM 199. For example, in various embodiments, data is striped independently across multiple groups of flash die, where each of the groups of flash die is independently accessible.

Figure 7:
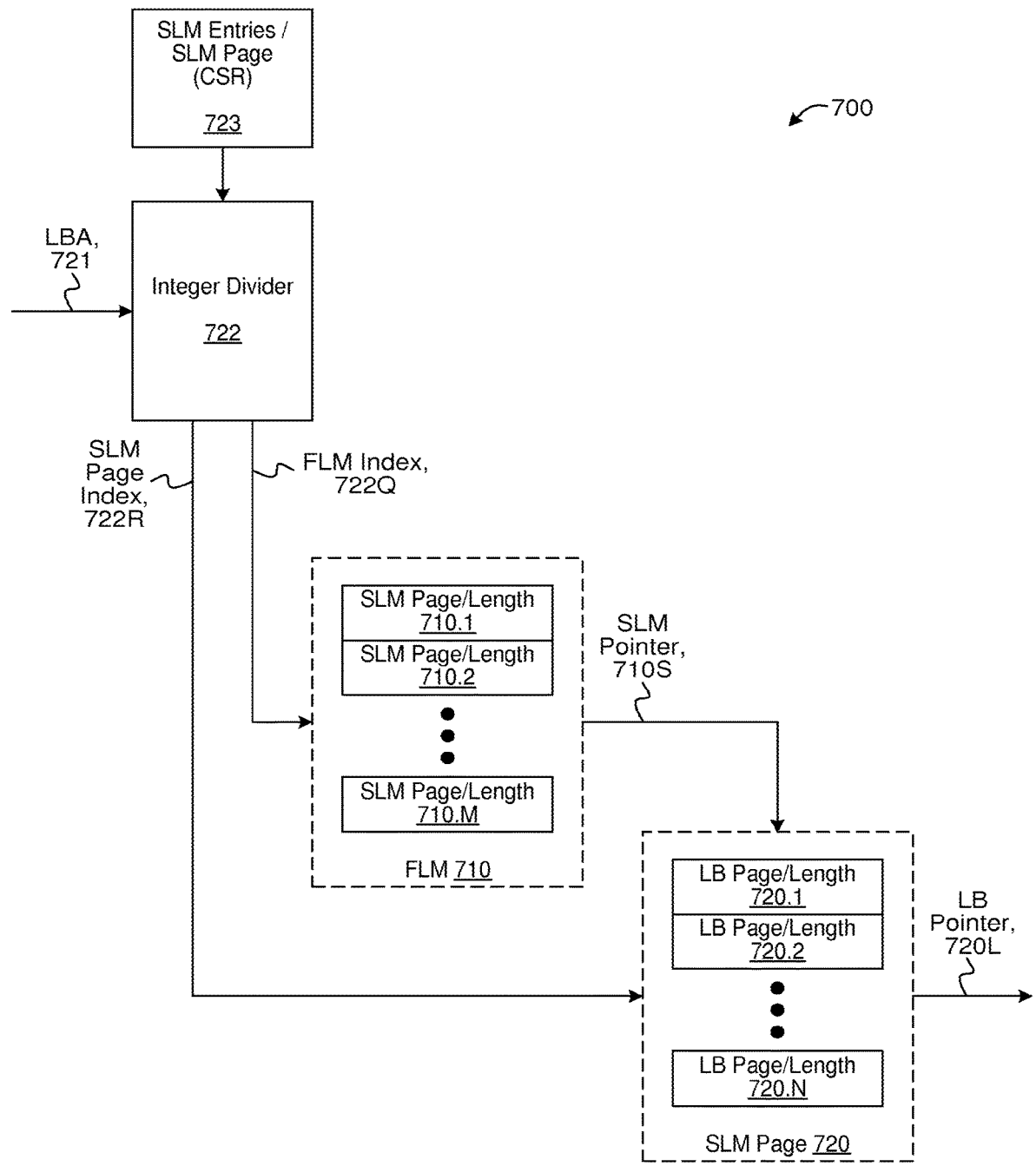
FIG. 7 illustrates selected details of an embodiment of mapping LBAs to Logical Blocks (LBs) stored in an NVM via a two-level map having a First-Level Map (FLM) and one or more Second-Level Map (SLM) pages.

FIG. 7 illustrates, as LBA to NVM Location Mapping 700, selected details of an embodiment of mapping LBAs to LBs stored in an NVM via a two-level map having an FLM and one or more SLM pages. The two-level map is implemented via a first-level element (FLM 710) coupled to one or more second-level elements illustrated conceptually as a single element SLM Page 720). The FLM includes a plurality of entries (SLM Page/Length 710.1 . . . SLM Page/ Length 710.M). Each of the entries of the FLM points to one of the SLM pages (such as SLM Page 720). The SLM page includes a plurality of entries (LB Page/Length 720.1 . . . LB Page/Length 720.N). Each of the entries of the SLM pages points to a location in the NVM where data begins (e.g., a read unit storing at least the beginning of host write data for an LBA). A divider (Integer Divider 722) receives a parameter from, e.g., a programmable hardware register (SLM Entries/SLM Page (CSR) 723), to divide an incoming LBA by to determine which FLM entry to select and which SLM entry (within the SLM page pointed to by the selected FLM entry) to select. The divider is coupled to the FLM and the SLM pages.

In various embodiments, the figure is illustrative of selected details of or related to Map 141 and/or Table 143 of FIG. 1A. For example, in some embodiments, Map 141 and/or Table 143 implement one or more caches of mapping information, such as one or more entries of an FLM and/or one or more entries of an SLM. An entire image of the FLM and/or the SLM is maintained in a portion of NVM (e.g., NVM 199 of FIG. 1A), and is undated, e.g., when the caches replace a previously cached FLM and/or SLM entry. In some embodiments, the FLM and/or the SLM entire images are implemented via rolling or ping-pong checkpoints, each of the checkpoints being a portion of the respective entire map image.

In operation, LBA 721 is presented to Integer Divider 722. The divider divides the LBA by a number of SLM entries per SLM page, as provided by SLM Entries/SLM Page (CSR) 723, resulting in a quotient (FLM Index 722Q) and a remainder (SLM Page Index 722R). The quotient is used to select one of the FLM entries, and a page field of the selected FLM entry is read (SLM Pointer 710S). The page field is used to select one of the SLM pages (e.g., SLM Page 720), and the remainder is used (e.g., as an offset) to select an entry the selected SLM page. A page field of the selected SLM page entry is used to select a particular location in the NVM, such as a particular read unit, where at least the beginning of the LB corresponding to the presented LBA is stored (LB Pointer 720L). In various embodiments, the LB pointer includes an address of a read unit of the NVM (e.g., read unit address 223 of FIG. 2). In some embodiments, each of the respective SLM entries includes a field encoding, e.g., length and/or span associated with data of a respective LB of the respective SLM entry. For example, the span describes how many (contiguous) read units are accessed to obtain all information (uncorrected data and associated error correction check bits) to determine the (error corrected) data of the respective LB. Continuing with the example, the length describes how much of the information read (e.g. in read units, such as illustrated by Length in Read Units 225 of FIG. 2) corresponds to the data of the respective LB. In some embodiments, each of the respective FLM entries includes a field encoding, e.g., length and/or span associated with reading an entirety of a respective SLM page specified by the page field of the FLM entry. For example, the span describes how many (contiguous) read units are accessed to obtain all information (uncorrected data and associated error correction check bits) to determine the (error corrected) data of the respective SLM page. Continuing with the example, the length describes how much of the information read (e.g. in read units, such as illustrated by Length in Read Units 225 of FIG. 2) corresponds to the data of the respective SLM page.

In various embodiments, the quotient is used as a key to access a cache, such as a fully associative cache of SLM pages. If there is a hit in the cache for a particular SLM page, then a latest copy of the particular SLM page is found in the cache without accessing the NVM. Providing fast access to a plurality of SLM pages enables, in some embodiments and/or usage scenarios, more efficient processing of random accesses to NVM and/or a plurality of independent streams of sequential data accesses to NVM (e.g. a first stream of sequential data accesses to a first region of LBAs interspersed with a second stream of sequential data accesses to a second region of LBAs).

Read Unit Length-Related Information Encoding

A data structure used for mapping host logical block addresses to NVM logical page addresses includes data length-related information used to control the number of contiguous read units of data transferred between SSD controller 100 and NVM 199, e.g., Length in Read Units 225 of FIG. 2. As described above with respect to FIGS. 2-5 and FIG. 7, a mapping structure converts a host storage address to an NVM logical page number (LPN) that specifies the address of an NVM read unit. The location of the first byte of non-header data of a read unit is specified by header information at the beginning of each read unit (FIGS. 4A, 4B). In some embodiments and/or usage scenarios, providing relatively more precise length information, e.g. for use by NVM space recycling (R-block recycling), improves performance and/or efficiency. In various embodiments, the relatively more precise length information is provided by map entries that specify both a relatively more precise data size and the number of contiguous read units to transfer to ensure obtaining all the data. Selected details relating to the various embodiments are illustrated in FIG. 8, a conceptual diagram illustrating examples of data length and span, and a decoding of encoded length information to obtain values of the data length and the span.

Figure 8:
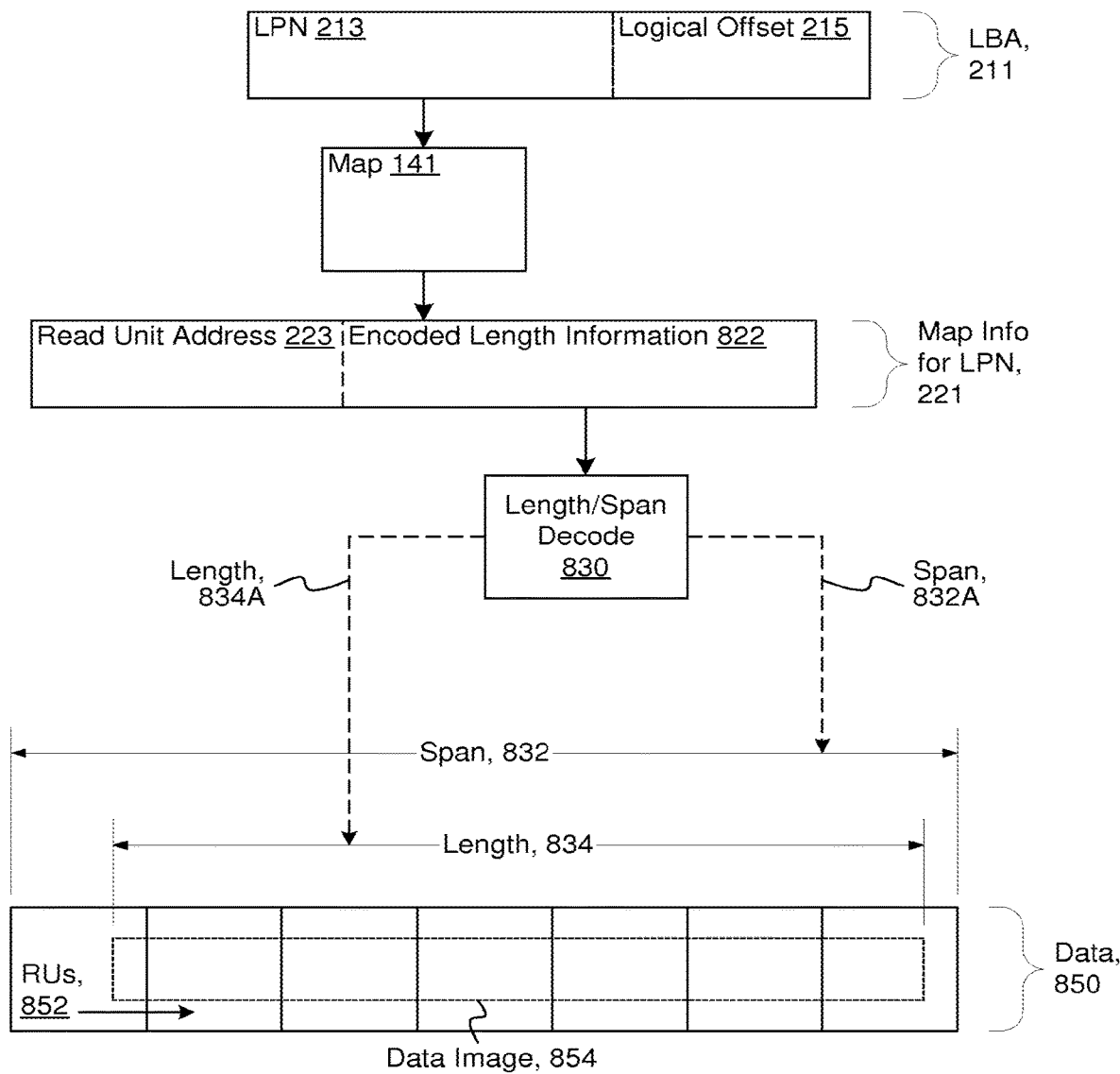
FIG. 8 is a conceptual diagram illustrating examples of data length and span, and a decoding of encoded length information to obtain values of the data length and the span.

The upper portion of FIG. 8 conceptually parallels FIG. 2 (identical reference symbols correspond to identical elements). However, embodiments illustrated by FIG. 8 include Encoded Length Information 822 instead of or in addition to Length in read units 225. The middle portion of FIG. 8 illustrates Length/Span Decode 830, converting Encoded Length Information 822 to Length number 834A, and Span number 832A. In some embodiments and/or usage scenarios, Length in Read Units 225 of FIG. 2 is an embodiment of Span number 832A.

The bottom of FIG. 8 illustrates a sequence of seven contiguous read units (RUs 852 and also illustrated as Data 850) that include Data image 854. The phrase "Data Image" refers to specific data bytes of interest that, as illustrated in FIG. 8, in some usage scenarios align with read unit boundaries and in other usage scenarios do not align with read unit boundaries. The bottom portion of FIG. 8 illustrates examples of the terms, "length" and "span", respectively as Length 834 and Span 832. A "span" number refers to a number of contiguous read units transferred between SSD controller 100 and NVM 199 as a conceptual group (RUs 852). The transferred read units contain the data bytes of interest, e.g., the Data Image. The length number, on the other hand, refers to the size of Data Image 854 contained within the transferred read units. In some conditions, as illustrated in FIG. 8, the size of the Data Image is smaller than the size of the contiguous read units containing the Data Image. The information about how many read units to transfer, e.g., the span of the transfer, is used, e.g., by Scheduling module 193 of Device Interface Logic 191 of FIG. 1A for initiating and controlling the data transfer. The information about the size of Data Image 854, e.g., the length of the Data Image, is used, e.g., by Recycler 151 of FIG. 1A to keep track of free and used NVM space when recycling R-blocks.

In various embodiments, read units have a fixed size, e.g., 512 bytes or 2048 bytes. In other embodiments, NVM comprises one or more regions, and read units in each region have a respective fixed size, but the respective fixed size of read units in a first one of the regions is different from the respective fixed size of read units in a second one of the regions. For fixed size read units, and span are expressed in terms of some number of read units, e.g., length=6.1 read units, and span=7 read units, as illustrated in FIG. 8. For example, the span is expressed as a positive integer number of read units (e.g., the 7 contiguous RUs 852), and the length is expressed as a non-negative real number of read units (e.g., the approximately 6.1 read units of length of Data Image 854).

In some conditions, a data image (e.g., Data Image 854) does not align exactly with read unit boundaries (e.g., the first and last bytes of a read unit), but begins after a read unit starting boundary and ends before a read unit ending boundary. In some embodiments and/or usage scenarios, non-aligned data images are located in close proximity to each other (e.g., an end of one is near a beginning of another), enabling data to be more tightly packed in NVM by minimizing wasted NVM space. The non-alignment results in a need to identify an exact location of the first byte (or, equivalently in some embodiments, the last byte) of a data image. FIGS. 4A, 4B, and 5 illustrate the use of headers at the beginning of read units to indicate precisely where within the read unit a data image begins, and illustrate that multiple data images within a single read unit are possible.

Consider four examples of the foregoing concepts. For each of the examples, a read unit of NVM has a fixed length of 512 B. In example one, a first 4 KB region is compressed to 400 B (400 bytes) in size. The 400 B is storable within a single read unit (with space left over). The stored data (the data image) is said to have a span of 1 read unit because the 400 B is entirely contained within a single read unit (e.g. the single read unit is read to read the stored data). The stored data has a length of approximately 0.8 read units.

In example two, a 4 KB region is incompressible, and is stored within 8 consecutive read units. The stored data occupies all of portions of 8 contiguous read units (corresponding to a span of 8 read units, e.g. the 8 contiguous read units are read to read the stored data). The stored data has a length of 4 KB, that, when expressed as a number of read units, is equivalent to approximately 7.8 read units. In example three, a 2 KB region is compressed to 1 KB in size, is stored within 2 contiguous read units (corresponding to a span of 2 read units, e.g. the 2 contiguous read units are read to read the stored data), and has a length of approximately 2.0 read units. Finally, in example four, a 1 KB region is incompressible, and is stored within the 3 contiguous read units, e.g., the stored data begins part way through a first read unit, extends all the way through a second read unit, and ends within a third read unit. The data is contained wholly within 3 contiguous read units (corresponding to a span of 3 read units, e.g. the 3 contiguous read units are read to read the stored data), and has a length of just fewer than 2.0 read units.

In some embodiments, length and span are encoded fully as separate numbers within Encoded Length Information 822, and in various other embodiments it is more efficient and/or provides for a greater precision of the length measurement to encode length using several bits and to encode a span offset using just a very few bits. The actual span number (e.g., the number of contiguous read units transferred) is then derived by combining the more precise length number with the span offset in various predetermined ways.

In various embodiments and/or usage scenarios, length is encoded as a fixed-point real number having format <X,Y>, where X represents an integer number of read units and Y represents a fractional number of a read unit. The foregoing representation for length enables granularities permitting compressed data to be more accurately accounted for R-block recycling. In some embodiments, the number of bits, k, used to encode the fractional part Y is selected to permit $2^k$ compressed logical blocks to fit within a single read unit, while in other embodiments, the number of bits of the fractional part Y is selected to permit $2^{(k-1)}$ compressed logical blocks to fit within a single read unit. In a specific example, four bits are used to represent the X-part, and an additional four bits are used for the Y-part.

In some embodiments, a span offset, designated by the symbol S, is encoded as a one bit sub-field of Encoded Length Information 822. Thus S has a value selected from {0, 1}. To determine the actual span number (e.g., the number of contiguous read units to transfer), the value of the offset S is added to the value of X+1, where X is the integer part of the length number <X,Y>. Since the difference between the integer part of the length number and the span number is variable between one and two, sometimes the resulting span number will cause an extra read unit to be transferred. Consider the following examples. In a first example, the length is 6.1 read units (Data Image 854, FIG. 8). The span number is X+1+S=6+1+S=7 read units. Then S has a value of zero. In a second example, the length is 7.0 read units (not illustrated), and the span number is X+1+S. Then even though S=0, one additional read unit is transferred. In a third example, the length is 5.1 read units and the data image begins near the end of the first read unit and ends near the beginning of the final read unit. The span number is X+1+S=5+1+S=7 read units. Therefore the value of the span offset S is one. For embodiments using a span offset of one bit, a tradeoff is made between sometimes transferring an additional read unit and using fewer bits to represent the offset, permitting an additional bit to be used for length representation.

In other embodiments, the span offset S is represented by a 2-bit sub-field of Encoded Length Information 822, and has a value selected from {0, 1, 2}. A value for the span number is obtained by adding the value of X to the value of the span offset, thus enabling a case where X is equal to the span and S=0, and a case where X is 2 less than the span and S=1.

In yet other embodiments, the span offset S is represented by a 2-bit sub-field of Encoded Length Information 822, and has a value selected from {−1, 0, 1}. A value for the span number is obtained by adding the value of X+1 to the value of the span offset. When the value of X is two less than the value of the span (as in one example above), enabling S=1 results in a correct number of read units being transferred, and when the value of X is equal to the value of the span (as in another example above), enabling S=(−1) results in a correct number of lead units being transferred.

In some embodiments, a value for the span number is obtained by adding the value of X+2 to the value of the span offset. Thus, depending upon the coding of the span offset, some combinations result in a minimum number of read units being transferred, and other combinations result in one additional read unit being transferred.

In other embodiments and/or usage scenarios, the encoded span is a positive integer number of read units, while the encoded length is a fixed-point offset of the form <N·M> read units that is subtracted from the value of the span to obtain a value for the length in read units of the data image. Thus length=(span−N·M) read units.

The granularity of the fractional Y-part of the <X,Y> format varies according to specific embodiments and/or usage scenarios. In some embodiments that do not waste NVM space, the granularity is settable to as low as one byte. In some embodiments that reduce storage space to increase address manipulation efficiency, the granularity of Y is some fraction of a read unit, for example, one half read unit, or less than one half read unit, such as one quarter read unit.

In some embodiments, such as embodiments where not all of the read units are a same size, the span is measured in read units and the length is measured in a fixed-size unit, such as a nominal size of the read units. For example, the length is represented as a number of 2 KB units with a fractional granularity of 64 B, and the span is a number of read units containing the data image. A respective size of each of the read units varies according to, for example, ECC requirements. Maintaining the length in units of a fixed size improves accuracy of used space accounting, in some scenarios. Maintaining the span in units of read units enables transferring a minimum amount of data from NVM to retrieve a particular data image.

Embodiments have been described where length, or alternatively a length offset, is encoded as a fixed-point number. Other embodiment are contemplated where length, or alternatively a length offset, is encoded as a floating point number, or any other encodings.

Length Encoding for Compressed Data

Compressing data stored in NVM (e.g. NVM 199 of FIG. 1A) enables, in some embodiments and/or usage scenarios, improved (lower) write amplification. Since the compressed data is smaller than the corresponding uncompressed data, tracking the location of the data and tracking the amount of free space accounts for the compressed data being smaller.

Sector-based systems, such as SATA Solid-State Disks (e.g., SSD 101 of FIG. 1A), write data in fixed-sized units, e.g. sectors. Example sector sizes are 512, 520, and 528 bytes, or other sizes in various embodiments. In some embodiments, a SATA SSD stores a plurality of contiguous sectors, such as eight contiguous sectors, as a unit, e.g. a logical page (Lpage), for example to reduce overhead of tracking sector locations in the SSD. Writing a subset of an Lpage, such as one sector, is performed, e.g., via a read-modify-write of the SSD (and in some operating contexts is lower performance than a write without a preceding read). Choosing an appropriate Lpage size trades off a number of less-than-logical-page-sized writes (performance in data writes) vs. system complexity and performance of map operations. (Smaller Lpages provide fewer read-modify-writes but increase the size of the map and the amount of snap activity.)

Some SSDs have a fixed-sized mapping—a group of sectors is treated as an Lpage, and an Lpage is mapped (e.g. via Map 141 of FIG. 1A) to a same-sized (ignoring ECC and system overheads) amount of storage in the NVM (e.g. NVM 199, FIG. 1A) controlled by the SSD.

Some SSDs provide compression of data of Lpages, such as via lossless compression, thus variably reducing the sizes of the Lpages. Mapping (e.g. via Map 141 of FIG. 1A) to variable-sized regions of the NVM accounts for the variable-size reductions. In some embodiments, the mapping is on a byte granularity so that no space if wasted despite the variable size of the Lpages. In other embodiments, the mapping is on other granularities (e.g., one-quarter or one-half of a read unit).

Specifying a precise location in NVM requires a relatively large address (due to the relatively large size of NVM). Hence, mapping the variable-sized Lpages to fine granularities in NVM (to not waste space) would require a relatively larger map (where, for example, each entry had to store a complete NVM byte address; not illustrated). Increasing a size of the map incurs additional overhead, as the map is, in some embodiments, over-provisioned many times more than data, and thus a cost of increasing the size of the map is multiplied by the amount of over-provisioning. For example, in some implementations, the map is over-provisioned by 300% (4× a required storage for the map).

In some embodiments, NVM is implemented and/or operated as units, such as read units (e.g. Read Units 610.0R0, 610.0R1, 610.0RR, 610.1R0, 610.1R1, 610.1RR, 610.65R0, 610.65R1, and 610.65RR of FIG. 6). Read units are, in some embodiments, a finest granularity of NVM that is readable with (e.g. lower-level such as ECC) error correction. In various embodiments, the user (non-ECC) portion of read units are one or more of: 512 bytes in size, 1 KB in size, 2 KB in size, any other size, and variable in size. In some embodiments, read units are variable in size (not illustrated) based on factors such as wear or bit-error-rate history of blocks of the NVM containing the read units.

By storing extra information in read units, such as a header for each Lpage starting in the read unit, a size of the map is reduced (FIGS. 4A, 4B, and 5). While the extra information uses a data portion of the overall NVM storage to store the header (vs. a map portion to store additional NVM address information), the efficiency of reading/writing the map is such that reducing the size of the map is, in some embodiments, preferable (Map 141, and Table 143 of FIG. 1A).

By storing zero or more headers in each read unit (FIGS. 4A and 4B) indicating the Lpages that start in the read unit (if any) and where the first byte of the Lpage is located (FIGS. 4B and 5), the map is enabled to refer to Lpages by a read unit address in NVM, rather than a byte address, and the size of the map is reduced. Since an entire read unit must be read (to be corrected), all the headers in the read unit are available, and the headers are able to provide the byte-granularity (or other granularity) information as to where individual Lpages starting in the read unit are located (as illustrated, for example, with respect to FIGS. 4A, 4B, and 5).

In various embodiments, a number of read units to read for an Lpage is stored in the map (rather than, e.g. solely in a header in the read unit containing the start of the Lpage), enabling, for example, starting all reads for the Lpage in parallel. In some embodiments, the map stores for each Lpage: the read unit address containing the start of the Lpage; and a number of read units to read, such as a number of sequential read units, e.g., the span (Span 832A of FIG. 8).

In some usage contexts, when an Lpage is written, space that the Lpage consumed in a previous R-block location is decremented (subtracted) from a total used space of the previous R-block, and space used by new contents of the Lpage is incremented (added) into a total used space of a new R-block that the new contents of the Lpage is written into (see, generally, FIG. 6). The decrementing and incrementing uses a previous length of the Lpage and a new length the Lpage. In some embodiments, the map also stores Lpage length information (e.g. Encoded Length Information 822 of FIG. 8).

According to various embodiments, the total available space in an R-block is one or more of: constant for all R-blocks; constant for most R-blocks but different for some R-blocks; and varying per R-block. For example, in a first embodiment, bad blocks are replaced (with good blocks) using a physical block mapping In the first embodiment, R-blocks are a constant size. In a second example embodiment, bad blocks in an R-block are skipped over its an addressing sequence, and R-blocks differ in size. In a third example embodiment, a code rate is varied in each block (or in each region of the SSD, for some granularity of regions) based on factors such as wear, error history of the block/region, and sampled bit error rate of the block/region. Varying the code rate varies an amount of user data per read unit, and thus varies a total size of each R-block.

In some embodiments and/or usage scenarios where data is sector-based and not compressed, a count of used space is accumulated in units of sectors. In some embodiments and or usage scenarios where data is Lpage-based and not compressed, a count of used space is accumulated in units of Lpages (such as units of eight sectors). In some embodiments and/or usage scenarios where Lpages are stored compressed, Lpage or sector-based granularity of space tracking results in relatively large inaccuracies in accounting for used space in R-blocks. In some situations, the inaccuracies result at a relatively large impact on performance, since garbage collection is unable to determine actual utilization of an R-block, and is unable to select optimal or relatively more optimal R-blocks for recycling.

Additional Implementation/Embodiment Information

In various embodiments, all or any portions of operations and/or functions, such as illustrated by FIGS. 2 through 8, are implemented, e.g., by one or more state machines. Example implementations of the state machines include hardware (e.g., logic gates and/or circuitry, dedicated state machine circuitry, or hardwired control circuitry), software (e.g., firmware or microcode), or combinations of hardware and software. In some embodiments, one or more of the state machines are implemented at least in part via the firmware, the driver, and/or the application. In various embodiments, one or more of the state machines are implemented in part via SSD Controller 100 of FIG. 1A, in part via firmware executed by CPU Core 172, in part via firmware 106 of FIG. 1B, in part via Driver 107, and/or in part by Application 109.

In various embodiments, all or any portions of operations and/or functions illustrated by FIGS. 2 through 8 are implemented, e.g., by, under control of, and/or in accordance with, any one or more of Coherency Management 179, Translation Management 177, and or Map 141 of FIG. 1A, via any combination of hardware, software, and/or firmware techniques.

Example Implementation Techniques

In some embodiments, various combinations of all or portions of operations performed for implementing storage address space to NVM address, span, and length mapping/converting, for instance using various techniques for encoding length-related information such as within table entries of an address mapping function (e.g. Map 141 of FIG. 1A), a computing-host flash memory controller, and/or an SSD controller (such as SSD Controller 100 of FIG. 1A), and portions of a processor, microprocessor, system-on-a-chip, applications-specific-integrated-circuit, hardware accelerator, or other circuitry providing all of portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verity, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialised), any combination thereof, or any other technique compatible with design and/or manufacturing of integrated circuit.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard progress or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the test and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators e.g.) used to identify and reference the features and elements of the embodiments.

The words "includes" or "including" are specifically intended to be construed as abstractions describing logical sets of open-ended scope and are not meant to convex physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flow-chart and diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication, links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising the steps of:
   determining a read unit address and encoded length information of one of a plurality of read units of a non-volatile memory (NVM) based at least in part on a page address of a particular page, the particular page comprising a particular one of a plurality of pages in a storage space address;
   decoding the encoded length information;
   determining a span specifying an integer number of the read units and a length in units having a finer granularity than the read units based at least in part on the page address;
   reading data associated with the particular page based at least in part on the read unit address and the span; and
   updating space usage information of the NVM based at least in part on the length.

2. The method of claim 1, wherein each of the read units of the NVM is a smallest quantum of correctable data readable from the NVM.

3. The method of claim 1, wherein the step of reading comprises accessing N integer ones of the read units, wherein N is based at least in part on the span.

4. The method of claim 3, wherein at least one of the N integer ones of the read units comprises at least some of the data associated with the particular page and at least some data associated with at least one other of the pages.

5. The method of claim 1, wherein updating the space usage information is in response to receiving, from a host, a disk write command.

6. The method of claim 1, wherein the step of reading the data further comprises parsing a header comprised in the read units, the header comprising an offset identifying the data associated with the particular page.

7. The method of claim 1, further comprising the step of updating the span of the particular page according to a number of the read units to access for retrieval of the data associated with the particular page.

8. The method of claim 1, wherein:
   the step of determining the read unit address comprises mapping each of the pages to respective read unit addresses of respective ones of the read units, the read unit address being the respective read unit address to which the particular page is mapped;
   the step of determining the span comprises mapping each of the pages to respective spans specifying respective integer numbers of the read units, the span being the respective span to which the particular page is mapped; and
   the step of determining the length comprises mapping each of the pages to respective lengths in units having a finer granularity than the read units, the length being the respective length to which the particular page is mapped.

9. The method of claim 8, further comprising the step of accessing a particular one of a plurality of entries of a map table, the map table associating each of the pages with a respective particular map table entry in the plurality of entries of the map table, the particular page being associated with the particular map table entry.

10. The method of claim 9, wherein the step of accessing further comprises:
    mapping the particular page to the read unit address;
    mapping the particular page to the span; and
    mapping the particular page to the length, wherein the particular map table entry comprises the respective read unit address, the respective span, and the respective length.

11. The method of claim 1, wherein the steps of determining a read unit address and encoded length information, decoding the encoded length information, determining a span, reading data, and updating space usage information are each performed by a storage controller.

12. The method of claim 11, wherein the storage controller is a Solid-State Disk/Drive (SSD) controller.

* * * * *